(12) United States Patent
Boon

(10) Patent No.: US 8,462,988 B2
(45) Date of Patent: *Jun. 11, 2013

(54) METHOD AND SYSTEM FOR UNIVERSAL LANE BOUNDARY DETECTION

(75) Inventor: Cathy Boon, Orange, CA (US)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 711 days.

This patent is subject to a terminal disclaimer.

(21) Appl. No.: 12/523,494

(22) PCT Filed: Jan. 22, 2008

(86) PCT No.: PCT/US2008/000750
§ 371 (c)(1),
(2), (4) Date: Oct. 6, 2009

(87) PCT Pub. No.: WO2008/091565
PCT Pub. Date: Jul. 31, 2008

(65) Prior Publication Data
US 2010/0054538 A1 Mar. 4, 2010

Related U.S. Application Data

(60) Provisional application No. 60/897,220, filed on Jan. 23, 2007, provisional application No. 60/897,082, filed on Jan. 23, 2007, provisional application No. 60/897,219, filed on Jan. 23, 2007, provisional application No. 60/897,225, filed on Jan. 23, 2007.

(51) Int. Cl.
*G06K 9/00* (2006.01)
(52) U.S. Cl.
USPC .......................................... 382/104; 382/103

(58) Field of Classification Search
USPC .... 382/103, 104, 195, 199; 701/301; 340/438
See application file for complete search history.

(56) References Cited

U.S. PATENT DOCUMENTS

| 5,555,312 | A | 9/1996 | Shima et al. |
| 6,819,779 | B1 | 11/2004 | Nichani |
| 6,829,388 | B1 | 12/2004 | Sakurai |
| 2003/0103649 | A1* | 6/2003 | Shimakage ................... 382/104 |
| 2003/0103650 | A1 | 6/2003 | Otsuka et al. |
| 2006/0132295 | A1* | 6/2006 | Gern et al. ................... 340/438 |
| 2006/0198444 | A1 | 9/2006 | Wada |
| 2006/0239509 | A1 | 10/2006 | Saito |
| 2008/0291276 | A1 | 11/2008 | Randler |

FOREIGN PATENT DOCUMENTS

DE 10349631 A1 5/2005

OTHER PUBLICATIONS

Laws, Kenneth I., "Rapid Texture Identification," Modern Utilization of Infrared Technology VI, Society of Photo-Optical Instrumentation Engineers Proceedings, vol. 238, Jan. 1, 1980, pp. 376-380. European Search Report issued in European Patent Appln. No. 08713198 on Jun. 17, 2010, 2 pages.

* cited by examiner

*Primary Examiner* — Claire X Wang
(74) *Attorney, Agent, or Firm* — Rothwell, Figg, Ernst & Manbeck, P.C.

(57) ABSTRACT

A method and system for detecting road markings, is provided. One implementation involves receiving an image (3) of a road (4) in front of a vehicle (2) from an imager (1), determining a region of interest in an identified road in the image, and detecting road markings (8L, 8R) by detecting lane markings (7L, 7R) in the region of interest, and if lane markings cannot be detected, then detecting road boundaries in the region of interest.

17 Claims, 22 Drawing Sheets

1- Moving average filter produces local mean

Local mean (scaled)
A + B + C

2- Substract local mean

3- Calculate mean absolute deviation (MAD)

| P | | Q | | R |

(Scaled) MAD = | P | + | Q | + | R |

4- Replace central pixel with MAD

⟶ MAD

METHOD AND SYSTEM FOR UNIVERSAL LANE BOUNDARY DETECTION

CROSS REFERENCE TO RELATED APPLICATIONS

This application is a 35 U.S.C. 371 National Phase Entry Application from PCT/US2008/000750, filed Jan. 22, 2008, and designating the United States, which claims priority under 35 U.S.C. 119(e) from U.S. Provisional patent application Ser. No. 60/897,082, filed Jan. 23, 2007, incorporated herein by reference. This application further claims priority under 35 U.S.C. 119(e) from U.S. Provisional Patent Application Ser. No. 60/897,225, filed Jan. 23, 2007, incorporated herein by reference. This application further claims priority under 35 U.S.C. 119(e) from U.S. Provisional Patent Application Ser. No. 60/897,219, filed Jan. 23, 2007, incorporated herein by reference. This application further claims priority under 35 U.S.C. 119(e) from U.S. Provisional Patent Application Ser. No. 60/897,220, filed Jan. 23, 2007, incorporated herein by reference.

FIELD OF THE INVENTION

The present invention relates to video image processing and in particular to detecting roadway features in video images.

BACKGROUND OF THE INVENTION

A detection system coupled to a video camera can be used to locate road lane markings and road boundaries. Conventional approaches exploit either the directed continuity of the boundary/stripe or the known size of the markings to locate them. Approaches using the continuity of the stripe fail when the markings are of the Botts dots type (domed, white, disks about 10 cm in diameter) or reflectors, which do not provide a sufficiently continuous signal.

Approaches using the known size of the markings fail when the marking has a different size. Finally, approaches using a Hough transform fail in difficult conditions (such as multiple, parallel, markings, where more than one solution exists) and require significant computation power. Other conventional approaches identify lane markings only by looking for vertical edges in the image of a road. However, vertical edge detection fails in curves, where the markings appear at a significant angle.

BRIEF SUMMARY OF THE INVENTION

The present invention provides a method and system for detecting road markings, such as lane markings or road boundaries. One embodiment includes an image processor configured for receiving an image of a road in front of a vehicle from an imager and determining a region of interest in an identified road in the image; and road marking detection module configured for detecting road markings by detecting lane markings in the region of interest, and if lane markings cannot be detected, then detecting road boundaries in the region of interest.

The image processor may be further configured for determining luminance gradients by determining edge strength in the region of interest to identify potential road marking edges, and the road marking detection module may be further configured for comparing edge strength to said strength threshold by determining peaks and valleys in luminance gradients of image pixels, wherein a gradient peak represents an edge in the image, and a gradient valley represents an edge in the image.

The road marking detection module may comprise a lane marking detection module configured such that, in multiple image rows in the region of interest, the lane marking detection module performs: identifying a pair of edges as potential road marking edges by comparing each edge strength to said strength threshold; determining spacing between the pair of edges; and comparing said spacing to spacing minimum and maximum thresholds; wherein if the edge pair spacing is between the minimum and maximum thresholds, then the edge pair represents potential lane marking; fitting a first line to the center gradient locations corresponding to edge pairs in said rows representing potential lane marking; and the road marking detection module selects all edge pairs that contributed to an acceptable first approximate line fit, as lane marking identifiers.

The road marking detection module may further comprise a road boundary detection module configured such that if said edge pair spacing is not between the minimum and maximum thresholds, or an acceptable line fit was not found, then the a road boundary detection module performs fitting a second line to individual edges in said rows representing potential road boundary identifiers, and selecting all edges that contributed to an acceptable second approximate line fit, as road boundary identifiers.

The road marking detection module may further be configured such that if no road boundary identifiers were found, then the road marking detection module performs: determining gradients of the mean absolute deviation (MAD) in said rows, fitting a third line to locations of MAD gradients whose magnitude exceeds a magnitude threshold individual edges in said rows representing potential road markings, selecting MAD locations that contributed to an acceptable third approximate line fit, as road markings.

The road marking detection module may further be configured for determining an acceptable line fit line by checking how well the line fit fits said edges, and similarity of the line fit slope to that in a previous road image.

These and other features, aspects and advantages of the present invention will become understood with reference to the following description, appended claims and accompanying figures.

DETAILED DESCRIPTION OF THE INVENTION

The present invention provides a method and system for universal lane boundary detection. One embodiment involves finding road markings including lane markings or road boundaries of a driving lane or road, using a video image of the lane or road. This is achieved by searching a video image region for significant gradients (e.g., luminance gradient) bordering image features of at least a minimum and up to a maximum size. The gradient search may be performed in the gray level image or in a mean absolute deviation image. The locations of the gradients are grouped together with curve fitting (choosing subsets, if needed) to obtain a proper fit quality and consistency. The curve fit features represent lane markings or road boundaries. An oriented and paired process finds lane markings, while an unpaired process finds road boundaries. A sequence of steps is used to find both stripe and simple edge type boundaries, passing multiple times through different versions or subsets of the same data, if needed.

Figure 1:
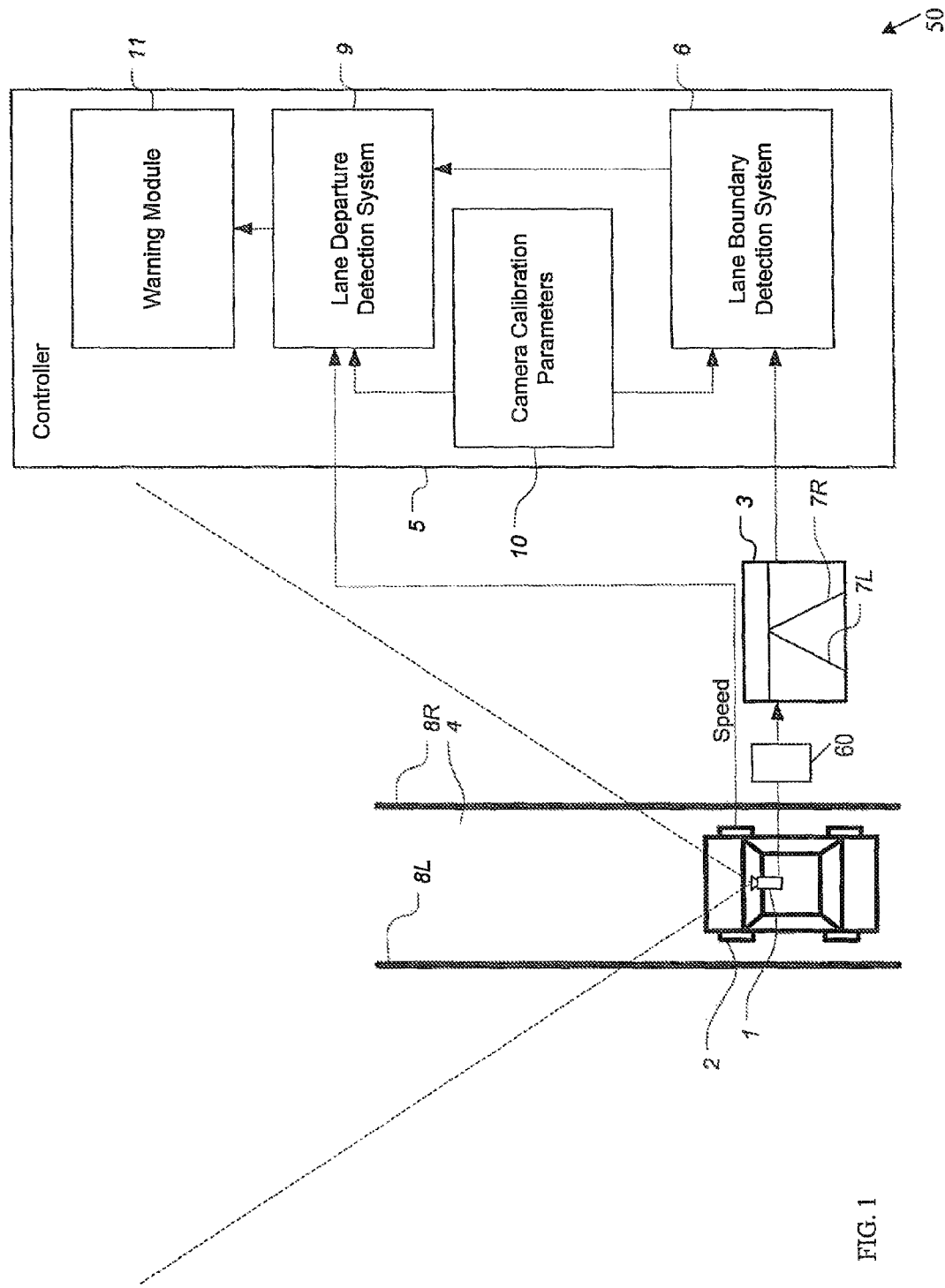
FIG. 1 shows a functional block diagram of a lane/road boundary detection and tracking system in conjunction with a vehicle, according to an embodiment of the invention.

For simplicity of description herein, lane markings and/or road boundaries are collectively called markings. FIG. 1 shows a functional block diagram of a lane (road) curvature measurement system 50 in conjunction with a vehicle 2 with a mounted camera 1, according to said implementation. The video camera 1 is mounted to the vehicle 2 in a forward pointing direction. The camera 1 captures (two dimensional (2-D)) images 3 of the lane (road/roadway) 4 in front of the vehicle 2 and transmits those images to a controller 5 for boundary detection. A sampler 60 may be used for sampling digitized video input signals to create a two-dimensional image as an array of pixels arranged in rows and columns.

In this example, the controller 5 includes a lane detector 6, a lane departure detector 9, a camera calibration module 10 and a warning module 11. The lane detector 6 processes the image 3 by road characterization and tracks in the image 3, positions of image features 7L and 7R that represent the actual markings 8L, 8R, respectively, on the roadway 4. In relation to camera 1, marking 8L represents the left side of the road, and marking 8R represents the right side of the road. The positions and yaw angles of the markings 7L and 7R (relative to the camera position) are provided to lane departure detector 9 by the lane detector 6. The lane departure detector 9 also receives speed information from the vehicle 2, and further receives calibration data (which may be provided by the calibration module 10). The lane departure detector 9 preferably receives vehicle speed, lane marking position, and yaw angle information, on a regular basis.

Based on the vehicle speed information, camera calibration information, the tracked marking positions the markings 7L and 7R, the lane departure detection system 9 determines if the vehicle 2 is leaving its proper lane of travel on the road 4. If the lane departure detection system does detect an imminent lane or road departure, then the warning module 11 is invoked.

Figure 2A:
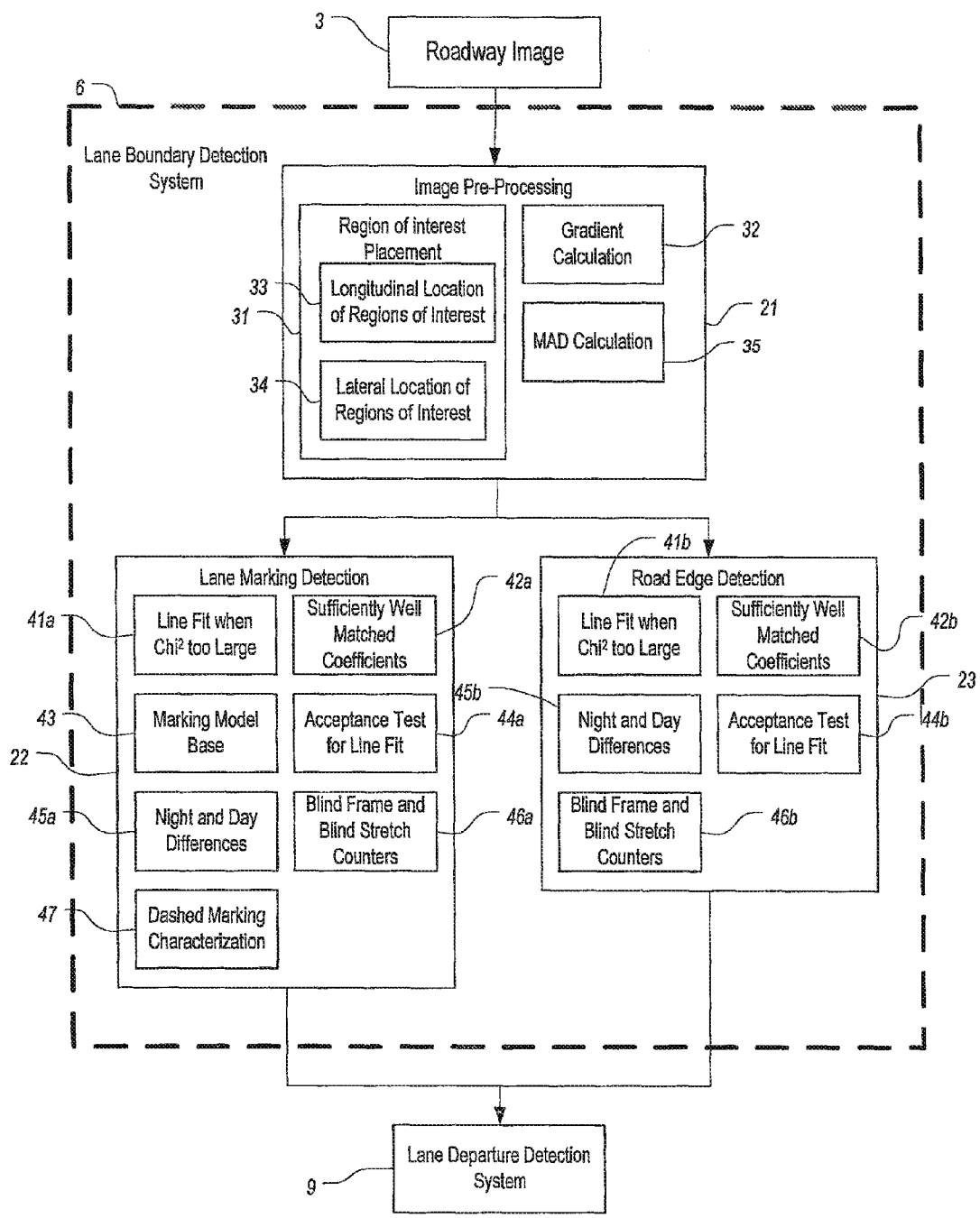
FIG. 2A shows a functional block diagram of a lane/road boundary detection apparatus, according to an embodiment of the invention.

FIG. 2A shows a functional block diagram of an example implementation of the lane detector 6, according to the present invention. The lane detector 6 includes an image pre-processing module 21, a lane marking detection module 22, and a road edge detection module 23. The image pre-processing module 21 pre-processes an image 3 comprising a 2-dimensional (2-D) array of pixels (rows and columns). The pre-processing module 21 includes a region of interest placement module 31, a gradient calculation module 32 and an optional, mean absolute deviation (MAD) calculation module 35.

For each received image 3 the module 31 determines the regions of interest where markings (lane marking or road boundary) 7L and 7R are expected to be in the image. The module 31 includes a longitudinal region of interest locator 33 and a lateral region of interest locator 34. The exact location of the regions of interest are governed by longitudinal region of interest locator 33 and the lateral region of interest locator 34. Within each region of interest, the gradient calculation module determines the pixel gray level gradients across each pixel row r from left to right.

Optionally, the MAD calculation module 35 calculates the mean absolute deviation around gradient pixels. The MAD module 35 measures the scatter of a set of numbers about their average. Two sets of numbers may have the same average, but different scatter values. This is useful where a road edge has little contrast to what is beyond it (i.e., in the image, the road and what is beyond it may have the same average value, but different scatter values), but the scatter of the pixel values about these same averages may be different, allowing better boundary detection. The average is a so-called first order statistic, while the mean absolute deviation is a second-order statistic.

If the calculated gradients show a DARK to LIGHT (positive gradient) followed by a LIGHT to DARK (negative gradient) pattern, such gradient locations are used by the lane marking detection module 22 to detect and track lane markings. Within the lane marking detection module 22, various refinement functions may be implemented, this to ensure that the correct lane markings 7L and 7R are identified and tracked, and to ensure the highest level of rejection of stray markings that could be misinterpreted as lane markings. Example refinement implemented by the module 22 include:

Function 41a: Line Fit when Chi$^2$ (chi-squared) is too Large.
Function 42a: Sufficiently Well Matched Coefficients.
Function 43: Marking Model Base.
Function 44a: Acceptance Test for Line Fit.
Function 45a: Night and Day Differences.
Function 46a: Blind Frame and Blind Stretch Counters.
Function 47: Dashed Marking Characterization.

If the distinctive positive to negative gradient pattern is not present within a region of interest, then the road edge detection module 23 is used to detect and track the lane boundary. Within module 23, refinement functions met be implemented, this to ensure that the correct lane boundaries 7L and 7R are identified and tracked, and to ensure the highest level of rejection of stray markings that could be misinterpreted as lane boundaries. Example refinement implemented by the module 23 include:

Function 41b: Line Fit When Chi$^2$ (Chi-squared) is too Large.
Function 42b: Sufficiently Well Matched Coefficients.
Function 44b: Acceptance Test for Line Fit.
Function 45b: Night and Day Differences.
Function 46b: Blind Frame and Blind Stretch Counters.

The line fit functions 41a and 41b, operate on the initial marking point candidates from the image pre-processing module 21. The functions 41a and 41b determine if chi-squared (a statistical measure for how well an approximating curve fits a set of data points) is lower than a chi-squared threshold (e.g., the threshold is greater than 0, and may be 2.0 for an acceptable fit). Large values of chi-squared (i.e., above the chi-squared threshold) indicate a poor fit between a curve and a set of points. If large chi-squared values are detected for a set of points (the initial marking point candidates), then subsets of the points are selected for curve-fitting until the chi-squared value is below the chi-squared threshold.

The well-matched coefficient detection functions 42a and 42b detect sufficiently well-matched coefficients, as follows. Road or lane boundaries generally move by small amounts one frame to the next. The mathematical function (e.g., curve) describing their location in the image similarly changes slowly. This change is quantified by the differences in the coefficients of the function describing such locations being less than a difference threshold from one frame to the next. The difference threshold can be greater than 0, and in one example may be 0.15, so tolerating an error of 0.15 for two frames right after each other, and allocating an additional difference of 0.03 for every additional frame. If the changes are larger than the difference threshold, then it is possible that two different boundaries or markings have been found in the two consecutive image frames (a situation to be avoided). Therefore, functions 42a and 42b test similarity of such coefficients for sufficiently well matched coefficients (i.e., change in coefficients is less than the difference threshold), before accepting a lane marking or road boundary found in a current frame as a continuation of the marking found in the previous frame(s). The chi-squared checking and coefficient matching test indicate the reasonableness of a curve-fit (e.g., line-fit).

Lane markings are required to have a minimum and maximum physical size (e.g., width, length) and a minimum contrast to the background. The physical size and contrast form the physical basis for locating markings in the image. The marking module base function 43 provides a conversion from physical, on the road, sizes of the marking to the equivalent number of pixels in the image. Each image pixel of image features 7L, 7R, is transformed from an image pixel position (defined by row r and column w in the image 3), to a road position defined by a on-the-ground distance ahead of the camera, and a lateral offset distance relative to the camera.

Acceptance test for line fit functions 44a and 44b determines how well lines fitted to sets of point candidates for markings or boundaries, reflect such point candidates, based on the standard chi-squared fit test.

Road boundaries and lane markings may have differing appearances depending on whether it is day or night. The day or night state may be determined from the imager gain and exposure time settings (the determination of day or night is performed externally). Based on such a state, night and day difference functions 45a and 45b provide different parameters to the marking/boundary location process, allowing better detection. For example, the gradients between the road background and lane markings are generally larger at night than during daytime, since the amount of ambient light is less, lowering the background luminance. For example, a minimum contrast of 15 gray levels between pixels during the day may be used, and a minimum contrast of 18 gray levels at night may be used. This difference comes from nighttime images having more contrast than daytime images.

Blind frame and blind stretch functions 46a and 46b track how many video image frames have not produced an identifiable or acceptable lane marking or boundary, measured from the time of the last frame that did produce an acceptable lane marking or boundary, and generate a blind stretch value representing the number of frames without an accepted measurement (i.e., number of blind frames). The functions 46a and 46b also track how much road distance has passed since a boundary or marking was found, and generate a blind stretch value, representing such distance. A large number of blind frames (e.g., for about 30 meters of distance traveled without finding a marking, this corresponds to about 10 frames at typical driving speeds), or too long a blind stretch (e.g., for about 30 meters of distance traveled without finding a marking, corresponding to about two cycles of a dash-gap type marking, so two dashes and the gaps between them), may lead to a large uncertainty as to where a marking or boundary might appear next. Such uncertainty causes the module 21 to enter or revert to a search mode, with a larger region of interest. Using a larger region of interest, without expectation of where the marking or boundary may be, allows the system to acquire a new feature for tracking.

The system has two states, called search and track. In search state, the system has not yet determined where approximately in the image (ROI) a marking may be, and so looks for said marking in a large image area. In track state, the system has recently (within a blind stretch) found a marking and so expects a marking again, in about the same area (ROI) in the image, thereby tracking markings in the ROIs. A track is a sequence of location measurements that belong together. A new track starts when one sequence terminates and another starts, and also at system initialization.

Dashed marking characterization function 47 determines where dashed markings start and end, and the longitudinal spacing between them (e.g., determining that a dash should start five meters ahead of the camera, is two meters long, and followed by a gap of 8 meters to the next dash starting). By learning where dashed markings are expected, the marking piece detections between dashes can be rejected as noise and tracking is improved.

The detected lane or road boundaries are then output to the lane departure detection module 9. The lane departure detection module 9 generates a warning or aids the driver when the vehicle is too close to, or imminently threatens to leave the lane or road. The modules and components shown in FIGS. 1 and 2A-B, can be implemented in many ways, such as program instructions for execution by a processor, as logic circuits, as an application specific integrated circuit, as firmware, as software modules, etc., as those skilled in the art will appreciate.

Figure 2B:
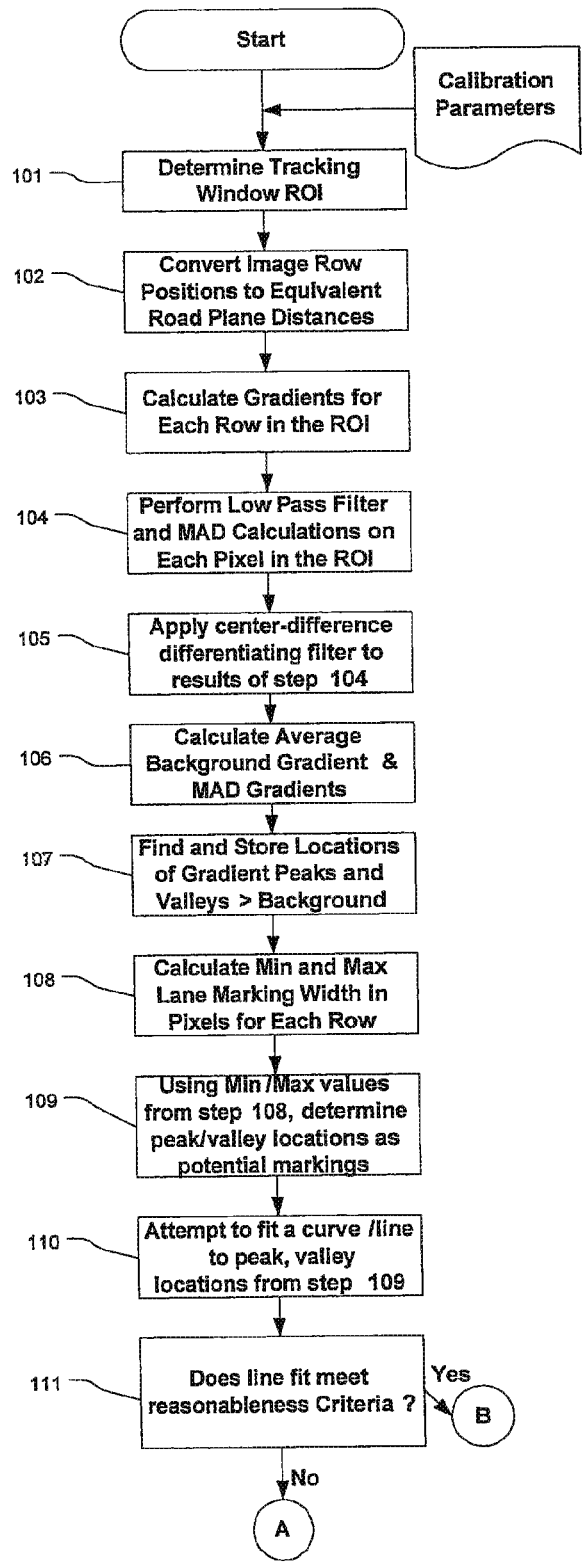
FIGS. 2B-D show flowcharts of a lane/road boundary detection process implemented by detection apparatus of FIG. 2A, according to an embodiment of the invention.
Figure 2C:
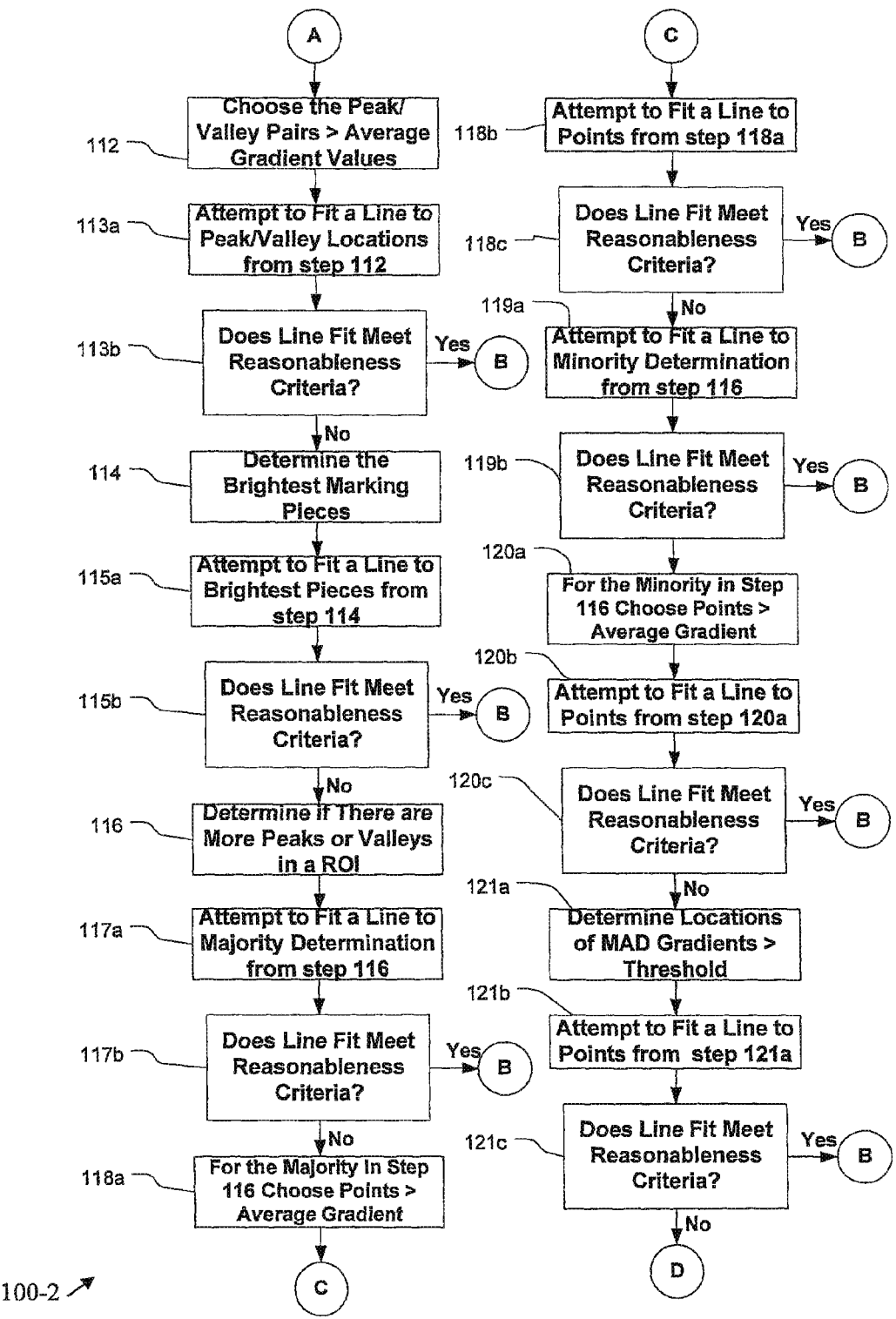
Figure 2D:
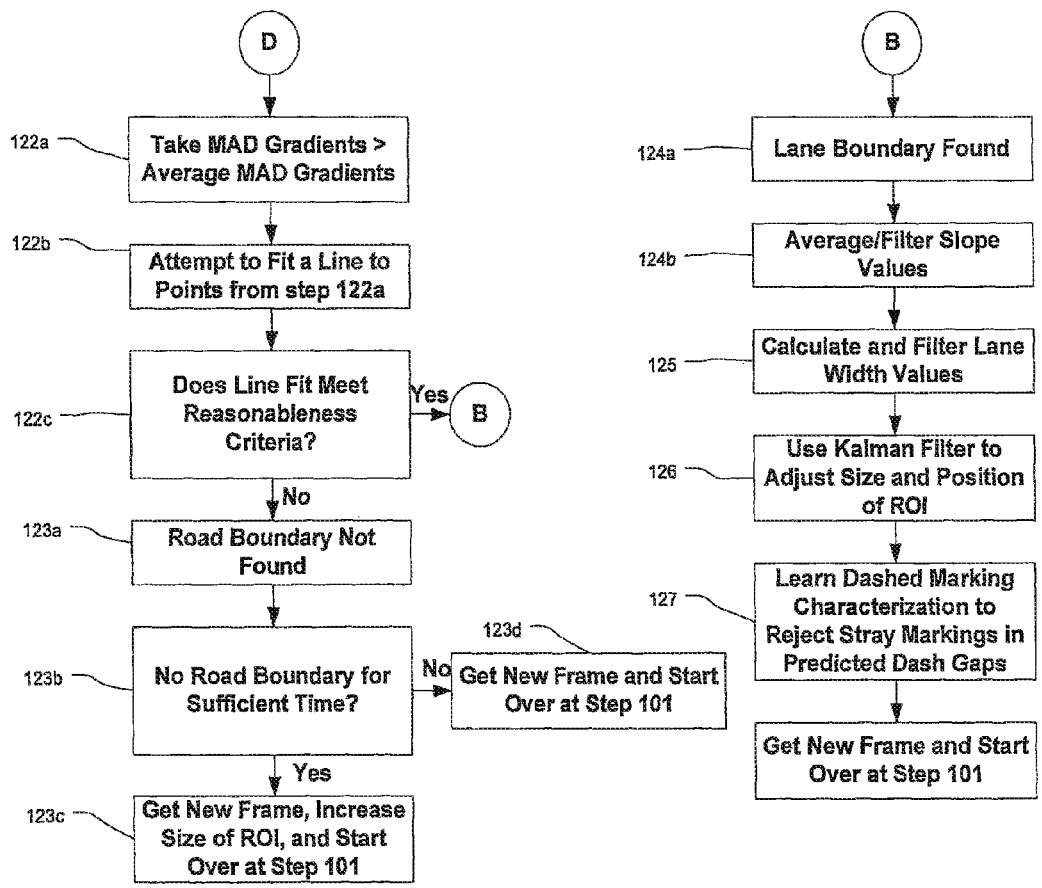

As discussed further below, FIGS. 2B-D show a flowchart of the steps of an example process 100 implemented by the road detector 6 in finding lane markings and or road boundaries (markings/boundaries) in an image taken from a vehicle, whose speed is known.

Figure 3A:
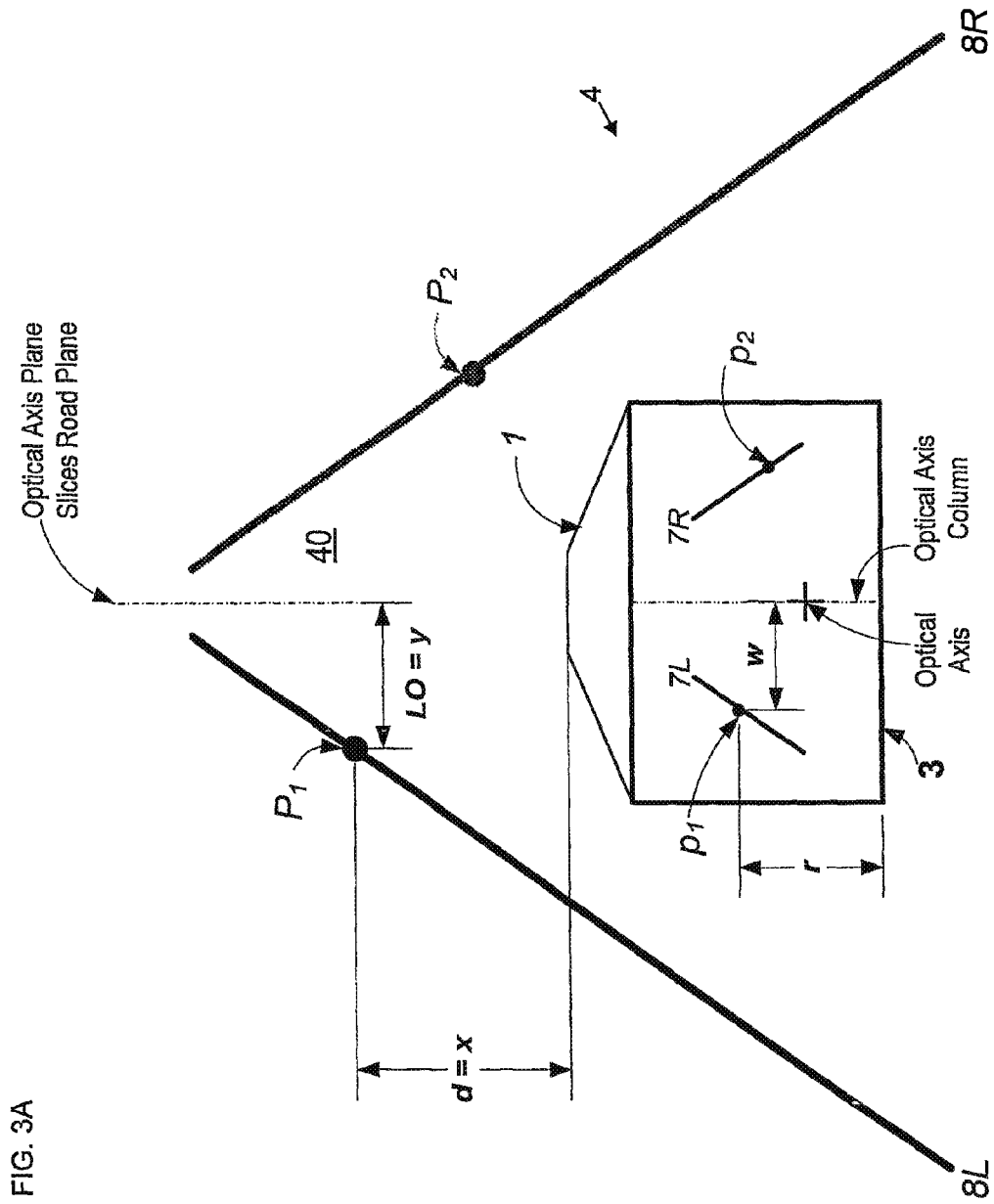
FIG. 3A shows an example of relationship between pixels in the image plane and corresponding points on the road plane that produced the image pixels via the camera, according to an embodiment of the invention.

For a better understanding of the lane/boundary detection process, FIG. 3A shows an example illustrating the relationship between pixels in the image plane and corresponding points P on the road plane that produced the image pixels p via the camera 1. An image 3 of the road 4 is superimposed on the plane 40 of the road 4. A first pixel $p_1$ at a first row and column position in the image 3 corresponds to a first road plane point $P_1$. Similarly, a second pixel $p_2$ at a second row and column position in the image 3 in the image corresponds to a road plane point $P_2$. Transforming from the pixel p1 at image position (r, w) to the point $P_1$ at road plane position (x, y), involves finding coordinate x based on row r, and finding coordinate y based on column w. A similar transformation is applied for the point $P_2$ and the pixel $p_2$.

Figure 3B:
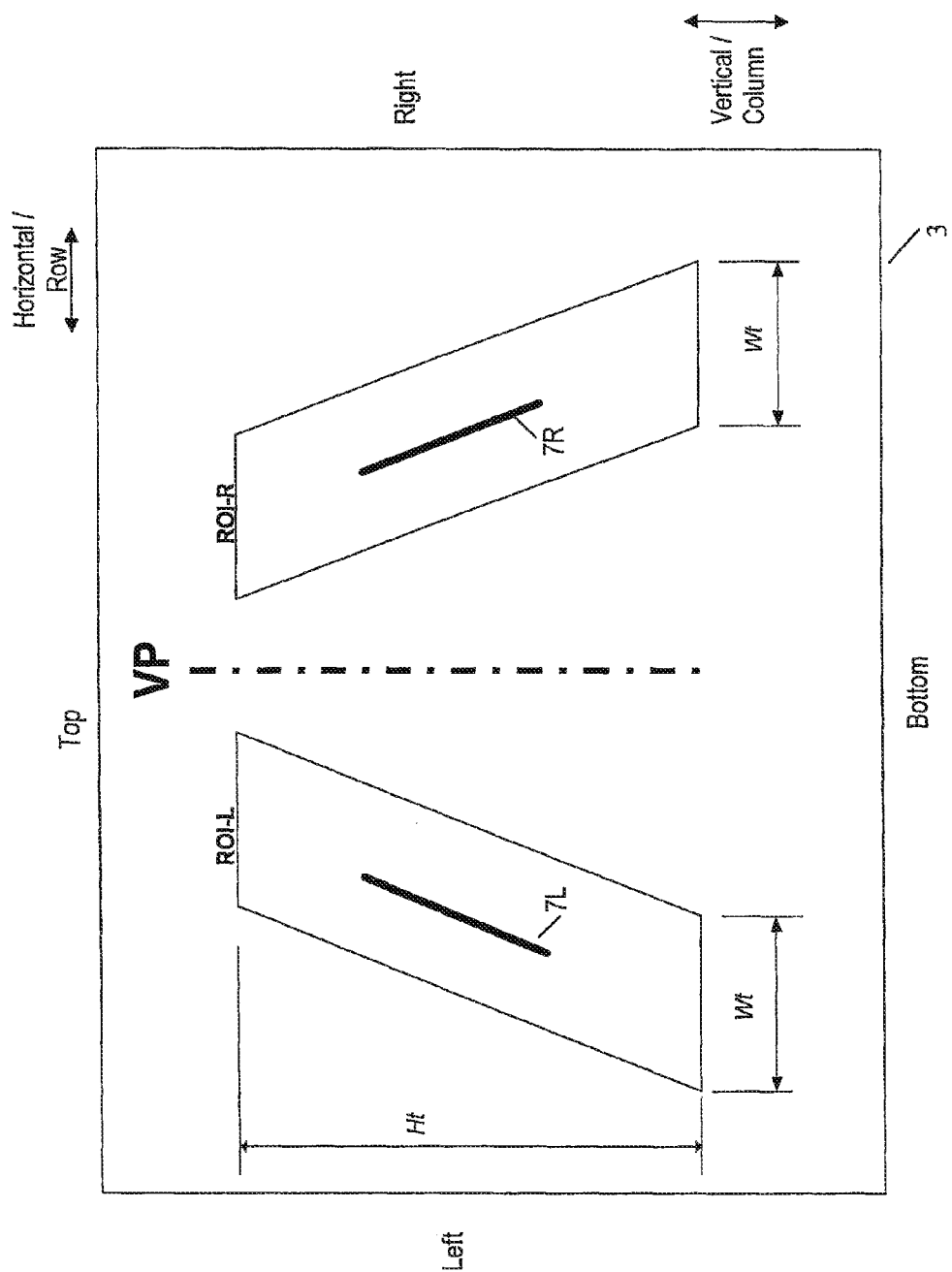
FIG. 3B shows an example selection of regions of interest in the image frame, according to an embodiment of the invention.

As such, given the points $P_1$ and $P_2$ on the markings 8L and 8R, the distance of each point from the camera 1 (i.e., longitudinal distance ahead of the camera d=x, and the lateral offset distance from the road centerline, LO=y) can be determined from the row and column (i.e., r, w) positions of corresponding pixels p1 and $p_2$ on the marking images 7L, 7R, in the image 3. FIG. 3B shows trapezoid-shaped regions of interest (ROI) onto the video image, within which gray level gradients and mean absolute deviations, are extracted from the image pixels. Both the gradient and deviation values are properties of groups of pixels, one describing the contrast between pixels and the other the variation from a central value, respectively. Each trapezoid (e.g., ROI-L, ROI-R) is placed approximately where image marking features (e.g., 7L, 7R) are expected to be in the image 3.

The road image 3 and vehicle speed are the detection system inputs, and the camera calibration geometry (focal length, mounting height, etc.) is known. Now also referring to detection process 100 (i.e., processes 100-1, 100-2 and 100-3 shown in FIGS. 2B, 2C and 2D respectively)-, steps 101-116 involve image pre-processing. Steps 107-115 involve standard lane marking detection. Steps 116-123 involve road boundary detection. Steps 124-16 involve post-processing. The process steps are now described:

Step 101: Select ground distances from the camera, at which to detect the markings/boundaries (e.g., between 6 and 20 meters ahead). These ground distances correspond to an upper image row (for a far distance) and lower image row (for a nearer distance), between which road boundary/marking detection is performed. Examples of lateral distances are as shown in FIG. 3B. The ground and lateral distances define two regions of interest or windows (ROI-L and ROI-R) in the image 3, within which searching is performed for detecting marking/boundary image features 7L, 7R, indicative of actual markings/boundaries 8L, 8R on the road 4.

Step 102: Determine the ground distance to all the image rows in between the top and bottom rows of the windows (ROI-L and ROI-R).

Step 103: Taking a minimum marking width to detect, and the ground distance d corresponding to each image row, determine the number of pixels in each row that such a minimum width marking would cover (rounding to the nearest integer). This number of pixels is used as the length of the low pass averaging filter in step 104 below.

Step 104: Apply a low pass filter, averaging the number of pixels of minimum marking length, for each row of the image. The low pass filtering generates a local average at each pixel. Optionally, calculate the mean absolute deviation (MAD) for each pixel at the same time. The MAD calculation is performed over the same length as the low pass filtering, and can be combined with it. The filter length varies with the image row, and has been calculated in step 103.

Step 105: Apply a centered-difference differentiating filter to the low pass filtered data from step 104. This generates a smoothed gradient value at each pixel location. Optionally, apply the same centered difference operation to the MAD data, generating a gradient of the MAD value at each pixel location.

Step 106: Starting from an assumed value for a first image frame, calculate the average background gradient. This average background gradient, multiplied by a factor, will be applied in the next image frame to find gradients that are not from the background (starting with a fixed minimum value).

Step 107: Using the scaled average background gradient magnitude as a gradient threshold, in each image row determine pixel luminance gradients, and find peaks and valleys in the pixel luminance gradient curve, that are higher and lower than the gradient threshold (strength threshold). The locations of the gradient peaks and valleys are stored.

Figure 7:
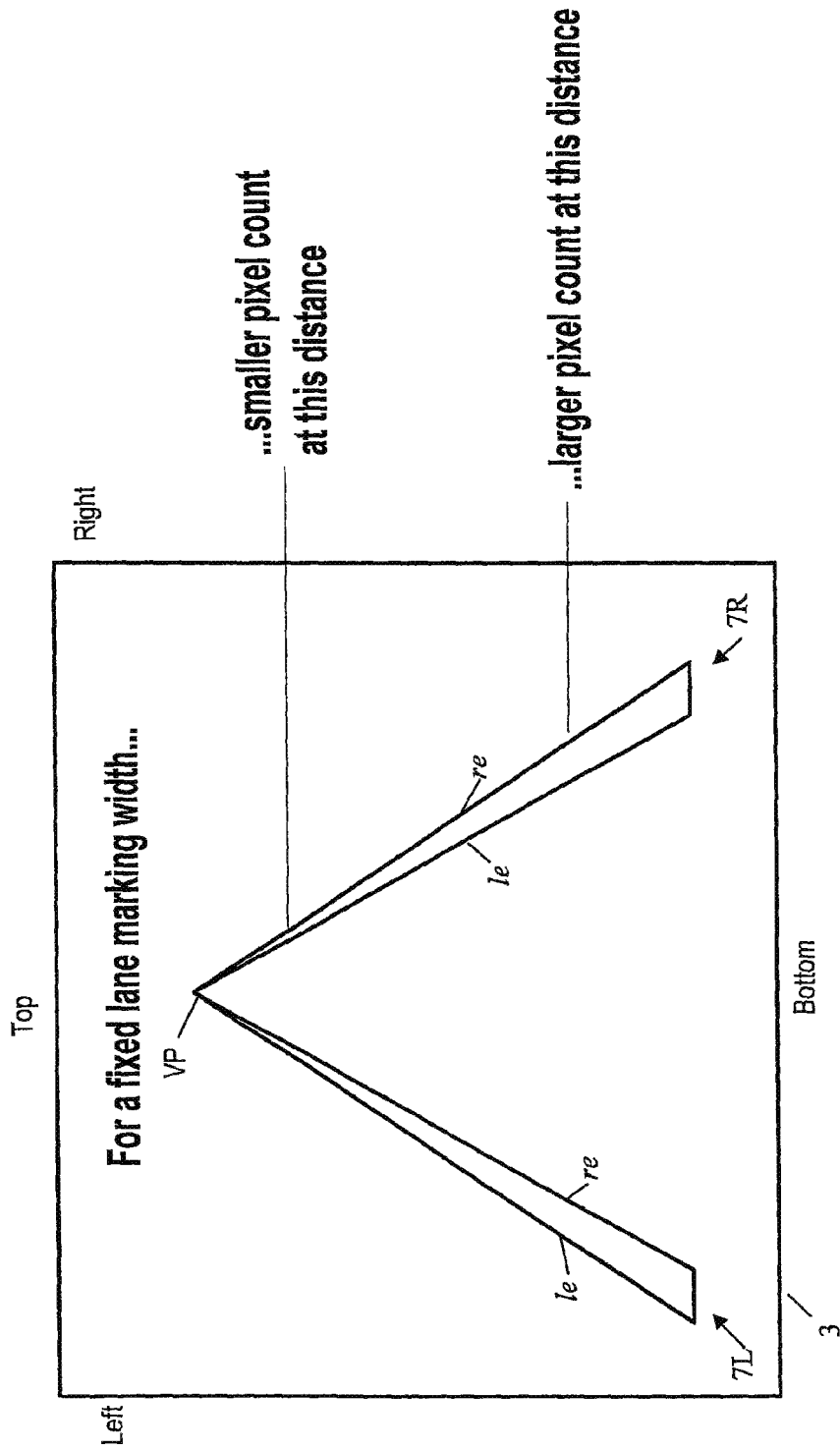
FIG. 7 shows the variation in filter length, computed from the minimum marking width, based on the row location in the image.

Step 108: A maximum width value (Marking_Width_Max) and a minimum width value (Marking_Width_Min) for a marking feature in the row is determined. These values are bounds for the pixel spacing between a peak and valley pair ("peak-valley pair") to be accepted as the left edge le and right edge re of a marking, respectively (FIG. 7). The left edge le (start of lane marking/boundary) represents a transition from dark to light (FIG. 5B), moving to the right, on to the marking, or small to large pixel luminance values, as a peak in the gradients. Similarly, the right edge (end of lane marking/boundary) represents a transition from light to dark, or large to small pixel luminance values, as a valley in the gradients.

Step 109: Find those peak-valley pairs that may be markings by applying the minimum and maximum marking width bounds in each row. Retain a peak-valley pair if an acceptable width is found, indicating at least a portion of a marking feature. In one example, searching for a possible feature of a marking in each row of region of interest, results in certain rows including possible marking features, while other rows do not include such possible features. The marking features are defined by the location of their left and right hand edges in each row.

Step 110: Determine if locations of edges on different rows generally line up, by fitting a curve (e.g., a generally straight line) to an inner marking edge (for a marking on the left side of the camera, the inner marking edge is the valley in a peak-valley pair; for a marking to the right side of the camera, the inner marking edge is the peak in a peak-valley pair).

Step 111: Using a least-squares fit, connect the inner edges of the possible marking features in each region of interest. Determine the quality of the fit based on certain reasonableness criteria (e.g., chi-squared and slope matching). Specifically, determine the quality (reasonableness) of the fit from the chi-squared fit measure (chi-squared of the first is compared with the chi-squared threshold, as discussed). If the fit quality is acceptable, then determine further determine the reasonableness of the fit by checking if the slope of the fit matches the slope of a prior fit (except at start up when no prior fit slope exists yet). If the slope is acceptable, then a marking feature is detected at the pixels defining the edges (store this slope for comparison with the next frame slope); go to step 124. Otherwise, go to step 112. In one example, the slope comparison for acceptability is as follows: the slope ES from a prior image fit, and the current slope CS for the current image fit, are compared such that the difference between the slopes ES and OS in an absolute value sense, should be small if these slopes come from the same marking (i.e., |OS−CS|<diffthreshold, wherein diffthreshold is greater than 0.05 and may have a value of 0.1 to 0.2).

Step 112: If chi-squared of the fit is too large (compared to the chi-squared threshold) or the slope did not match the previous slope closely enough, select a subset of the possible marking feature points (as defined by said peak-valley pairs) and apply the same line fit techniques and quality (reasonableness) criteria as step 111 to the subset of the marking feature points to determine if the subset of provides better chi-squared and/or slope match. The subset is those peak-valley pairs whose left and right hand gradients both exceed the average gradient magnitude of all the possible marking features. In other words, we select only those possible marking features (marking pixels) which have strong, above average, contrast (gradient) on their left and right-hand sides.

Step 113(*a-b*): Fit a curve to the strong contrast (selected) subset. If either chi-squared is too large or the slope does not match the slope in the last pixel frame closely, the subset is rejected, go to step 114. Otherwise, the fit to the subset if acceptable, proceed to step 124.

Step 114: Select a subset of all possible marking features, with only the brightest image marking features selected. The brightness of a feature is the average gray level of the pixels between the left and right hand edges of the marking feature. Calculate the average brightness of all the possible marking features, and then, using the average as a threshold, retain only those marking features whose brightness is greater than this average threshold.

Step 115(*a-b*): Fit a curve or line to the selected, brightest than average, markings, and check chi-squared and slope for this fit (as above). If both chi-squared and slope are acceptable, then the selected brightest marking features are acceptable, go to step 124. Otherwise, if chi-squared is too large or the slope does not match the recent past, a proper fit is not found and the selected marking pixels are not from lane markings; switch from lane marking detection to road boundary detection and proceed to step 116 to detect an edge for the road, possibly defined by a gradient (contrast) being visible there.

Step 116: To detect road edges, use the previously calculated pixel gradient data from each image row, and count whether there are more positive gradients or negative gradients that exceed a magnitude threshold. Analyze those gradients that there are more of (the majority), checking if these gradient locations generally line up, as above, implemented as steps 117-120, below.

Step 117(*a-b*): Taking the locations of the gradients in the majority, determine if the gradients line up when fit with a curve. Check if chi-squared is small enough, and if the slope of the fit matches the recent past. If yes, a lane boundary is properly detected; go to step 124. Otherwise, lane boundary is not detected using said locations, proceed to step 118.

Step 118(*a-c*): Select a subset of gradients as only those gradients from the majority whose value exceeds the average gradient magnitude in the majority. Determine if a curve fit to the selected subset of gradients has a sufficiently small chi-squared and a slope similar to the past. If yes, then the fit is acceptable as detecting road boundaries; proceed to step 124. Otherwise, since chi-squared is too large or the slope is too different from that seen in the past, the subset of gradients do not indicate a road boundary; proceed to step 119.

Step 119(*a-b*): Taking the gradient locations of the minority, determine if these line up when fit with a curve (i.e., determine if chi-squared is small enough, and if the slope of this fit matches the recent past). If yes, these indicate a road boundary; go to step 124. Otherwise, the further subset does not represent road boundary, go to step 120.

Step 120(*a-c*): Select only those gradients from the minority that exceed the average gradient magnitude in the minority, and determine if a curve fit to the selected minority gradients has a small chi-squared and a slope similar to the past. If yes, the fit is acceptable (indicating a road boundary); go to step 124. Otherwise, a road boundary is not detected by analyzing the gradients only, wherein further analysis using the mean absolute deviation (MAD) in the image is undertaken starting with step 121.

Step 121(*a-c*): Find the locations of those MAD gradients whose magnitude exceeds a magnitude threshold (e.g., from 1 to 255 for an 8-bit imager, and preferably from 5 to 20). Determine if the locations line up when fit with a curve based on the chi-squared and the slope of the fit. If chi-squared is small enough and the slope of the fit matches what was seen in the recent past, the fit is acceptable (indicating a road boundary); go to step 124. otherwise, said locations do not represent a road boundary; proceed to step 122.

Step 122(*a-c*): Select locations of those MAD gradients whose magnitude exceeds the average magnitude of the MAD gradients, and determine if these locations line up by checking chi-square and slope of a curve fit for these locations. If yes, then the fit is acceptable (these locations represent a road boundary); go to step 124. Otherwise, these locations do not represent a road boundary, and the frame including the locations is a blind frame (neither a marking nor boundary has been found), go to step 12.

Step 123(*a-d*): Since the current video frame (image) is blind, it causes the distance traveled since the last not-blind frame (the blind stretch) to increase, as well as a blind frame counter to increment. Too long a blind stretch (e.g., about 30 meters) or too many blind frames (e.g., about 10 frames at typical driving speeds) means the system has not found a lane marking or boundary for a long time period and so it proceeds back to the search state (in both the track and search states, the system checks for a marking using the above steps, the difference being that in tracking mode the system checks a smaller area of the image (ROI) than in the search mode).

Step 124(*a-b*): One or more image features with an acceptable curve fit, representing a lane marking or road boundary, have been detected. The slope (or, more generally, the coefficients) of the curve fitting the marking points is stored and averaged with other past coefficient values. The averaged (or filtered) coefficient value is used to test the next image frame for similarity, as in the testing for a slope similar to the recent past. If there are blind frames, the requirements on similarity of slope and/or coefficients are loosened, as discussed further above.

Step 125: If a lane marking was detected, take the widths of all the detected image features, convert them to meters, average them, and pass the average through a low pass filter to remove noise. The filtered average lane width is used to selected a single possible marking feature if more than one is found in an image row. The system detects gradient peaks and valleys each row. There may be more than one peak-valley pair present in a row, and the spacing of the multiple peak-valley pairs may be such that they all fall within the larger than the minimum and less than the maximum width constraint. In that case, the system selects among the multiple peak-valley pairs, one peak-valley pair whose peak-to-valley spacing most closely matches that of a prior image's lane marking width. If in the current image, more than one peak-valley pair matches the past spacing, then the nearest peak-valley pair that matches the past width is selected. The nearness is measured in relation to the expected marking position.

Step 126: Determine the regions of interest for the next image frame. Kalman filtering may be used to determine where the regions of interest shall be in the next frame. Details of Kalman filtering can be found in the book 'Estimation and Tracking', by Bar-Shalom. The region of interest (window) lateral size is reduced when location of the lane marking or road boundary is known, and enlarged when location of a lane marking or boundary is unknown or uncertain. The Kalman filter expresses this uncertainty in its covariance matrix. The regions of interest L, and R (FIG. 3B) are always at least 4 minimum marking widths wide. The region of interest is placed where the marking is predicted (expected) to be in the next image frame. In the search state, when no marking has yet been found, the region of interest is placed at a default location, and with a maximum width, so that markings can be located.

Step 127: Optionally, an additional step may involve learning where dashed markings start and end, rejecting possible marking piece candidates in the gaps between the dashes. This is called Dashed Marking Characterization, and the dash/gap pattern learned in one image frame is applied in the next frame. This step may be performed between steps 109 and 110.

In the above steps, sufficiently well-matching coefficients between frames means that there is not a significant change occurring between consecutive frames. Specifically, if a line fit, for example, is performed at frame u, then v frames later at frame (u+v), the markings in the image may be described as:

$$r=m(u)*w+b(u)$$

and $$r=m(u+v)*w+b(u+v),$$

wherein r is the row of a point (pixel) in the marking, w is the column of a point in the marking (or boundary), m is the slope of the marking, and b is the intercept, (u) indicates at frame n, and (u+v) indicates at frame u+v.

The marking slope m and intercept b can vary with time. Well-matched coefficients are defined as existing when:

$$|m(u)-m(u+v)|<\text{Constant1}+(v-1)*\text{Constant2}.$$

The right-hand side of this inequality increases with v, which allows the difference of slopes:

$$|m(u)-m(u+v)|,$$

between two time-separated frames to increase with the time separation v. Constant1 and Constant2 are both positive quantities. Constant1 (e.g., ranging from 0 to 1, and preferably between 0.1 and 0.3) is the maximum acceptable difference between slopes for two consecutive frames, and Constant2 (e.g., ranging from 0 to 1 and preferably from 0.01 to 0.1) is sized to reflect the increasing uncertainty in the slope difference as v increases.

The well-matched coefficient test and the chi-squared test above are used in process 100 (FIGS. 2B-D) to check reasonableness of the line-fit used (i.e., steps 111, 113b, 115b, 117b, 118c, 119b, 120c, 121c, and 122c). An example implementation of steps of the process 100 is described in further detail below.

Image Pre-Processing (Steps 101-106)
Implementation of Steps 101 and 102

Referring to FIG. 3B, trapezoid-shaped regions of interest or windows (ROI) are identified in the image3, within which determination of gray level gradients and mean absolute deviations of pixels, is performed. Each trapezoid shape ROI in the image 3 corresponds to a parallelogram shape on the road 4 (e.g., ROI-L and ROI-R correspond to a pair of parallelograms 160-L, 160-R, respectively on the road 4 shown in FIG. 3C, spaced laterally 3 to 4 meters apart, wherein each parallelogram is about 0.7 to 2.3 meters wide, about 14 meters long, with a lower edge about 6 meters from the camera 1 and an upper edge about 20 meters from the camera). The size of each ROI in the image, given by its width (Wt) and height (Ht), is sufficiently large to accommodate errors in the expected location of image features of markings 7L, 7R therein. When general location of the marking images 7L, 7R is not known, then the region of interest (or window) is maximally sized in width.

In one example, each ROI corresponds to the parallelogram shape on the road that is at least four minimum marking 8L or 8R widths wide (at most 2.3 meters wide). The upper width limit is constrained by computational capacity. Each ROI covers a distance on the road 4 starting about 0.7 meters to the left (or right) of the camera, going out to about 3 meters, covering the great majority of road lane and vehicle widths. The width of the windows ROI-L and ROI-R is at a maximum when in the marking search state, and smaller in the marking tracking state, depending on the uncertainty in the prediction of the lateral location of the markings in the image. The regions of interest are initially placed symmetrically about the vanishing point VP of the road in the image. In tracking state, when a marking or boundary has been detected in an ROI in a current image frame, then an ROI for the next image frame is placed where the marking or boundary is expected in the next image frame based on its location in the current image frame.

Implementation of Steps 103 and 104

Figure 3C:
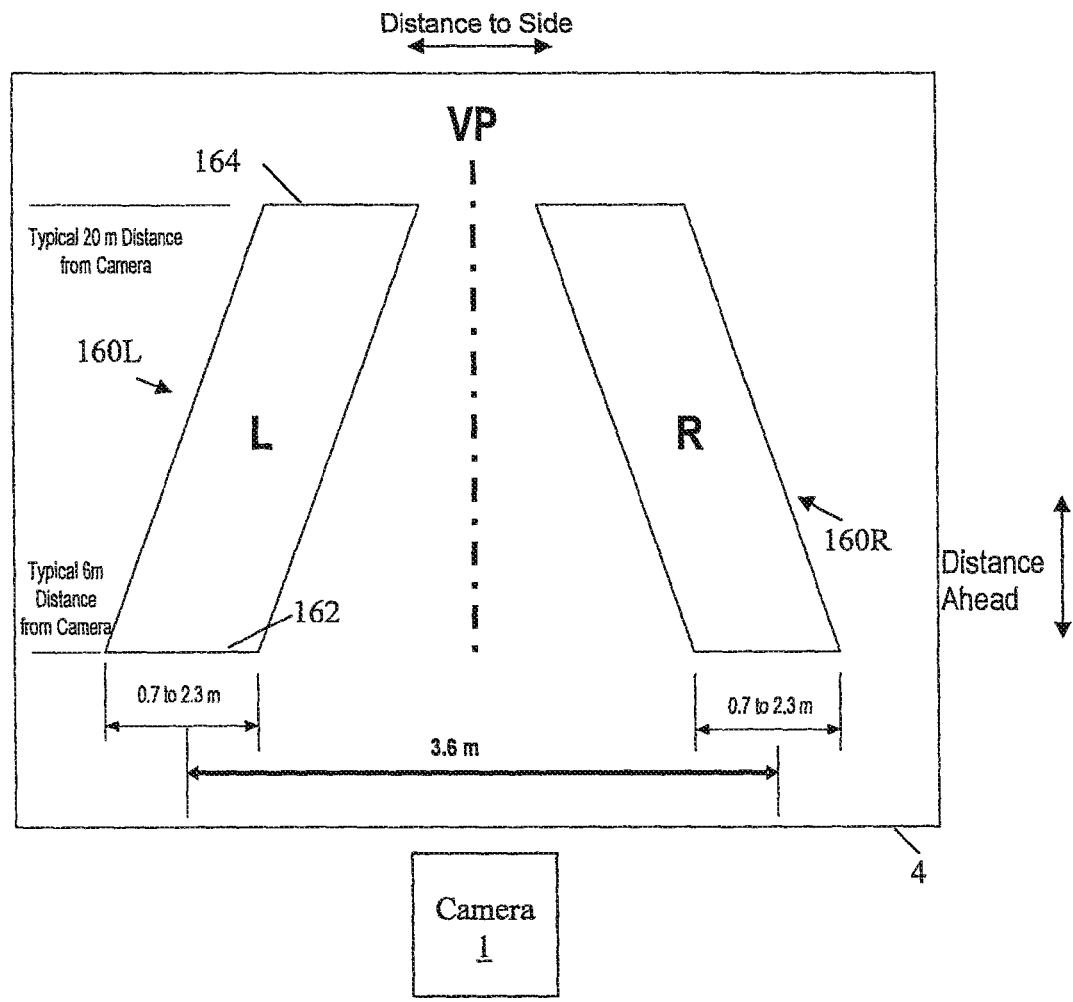
FIG. 3C shows example parallelogram areas on the road corresponding to regions of interest in the image.
Figure 3D:
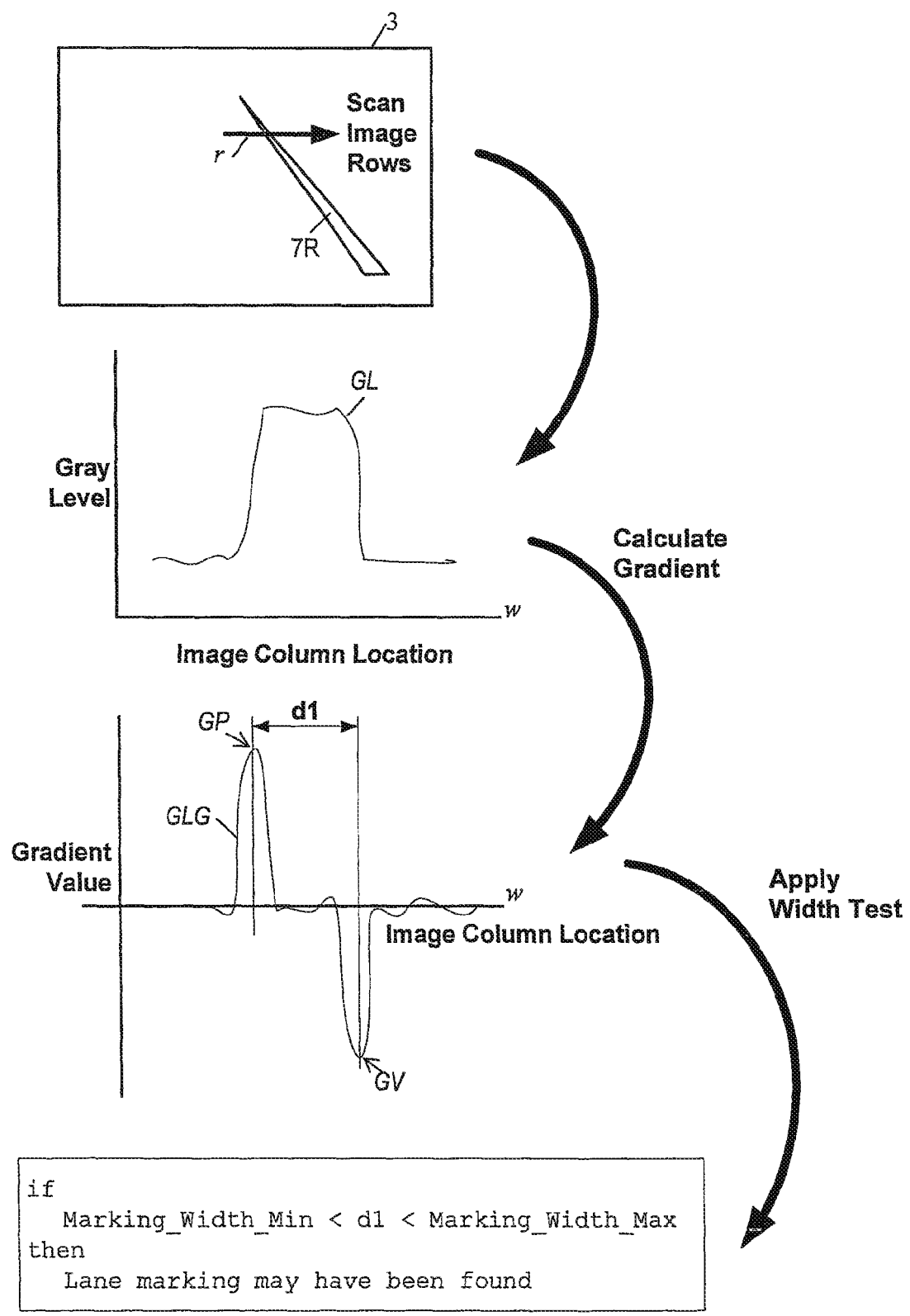
FIG. 3D shows an example of gradient detection and width testing in an image, according to the invention.

Referring to FIG. 3D, each image row r of pixels p in the ROI is scanned and pixel gray levels (GL) are calculated for each image column location w of the row r. Then, gray level gradients (GLG) are extracted in each row, between neighboring pixels. If the pixel distance d1 between a gradient peak (GP) and a gradient valley (GV) is between Marking_Width_Min and Marking_Width_Max, then a marking image feature may have been found at the pixels locations between the gradient peak-valley pair (GP-GV). Since lane markings are brighter than their background, the gray levels therefore become brighter (positive gradient) as one moves onto a marking and darker (negative gradient) as one moves off again. We look for positive and negative gradients (peaks and valleys) with the proper spacing, which might be a portion or piece of a lane marking 7L, 7R.

Figure 4:
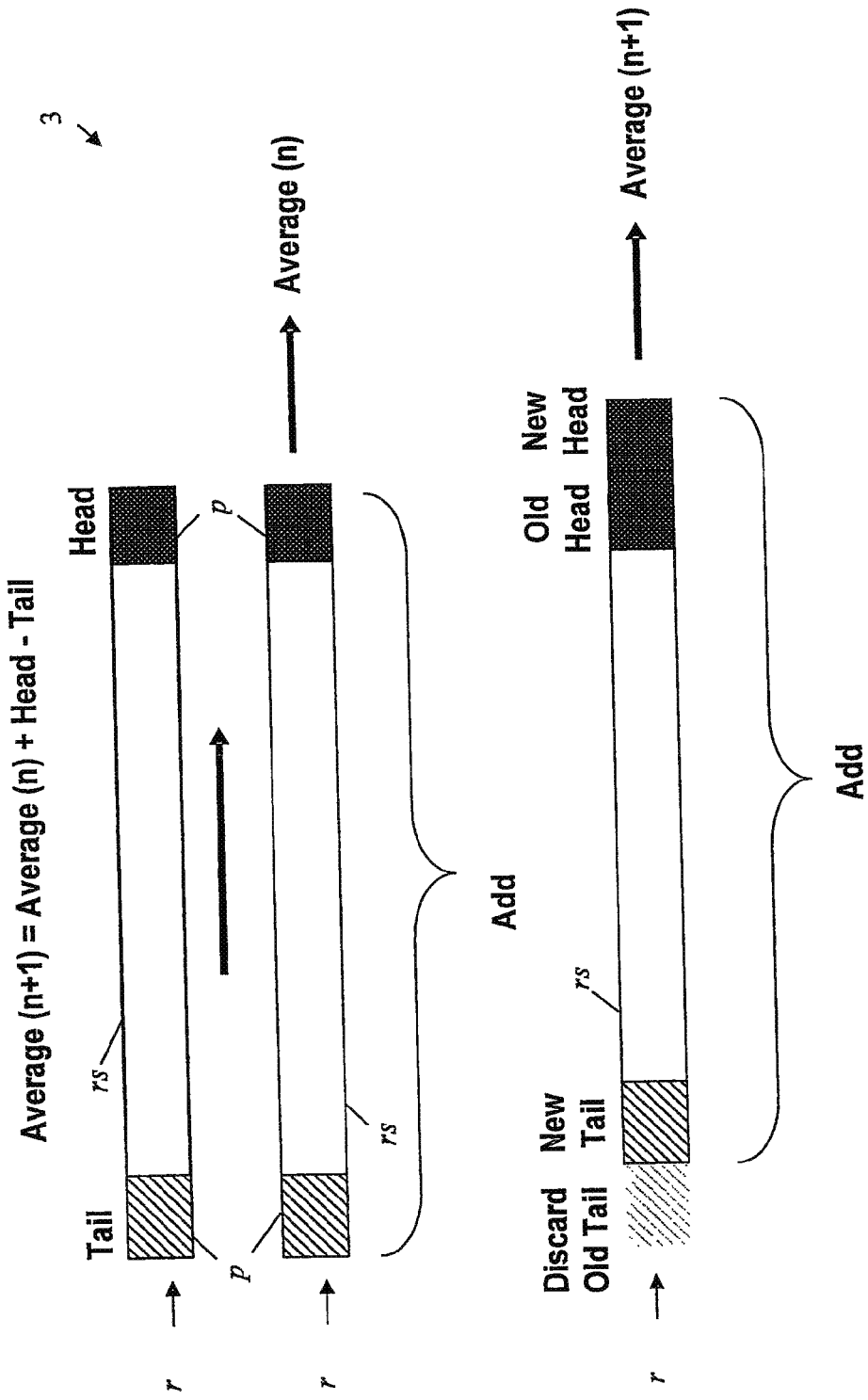
FIG. 4 shows an example of fast low-pass filtering of an image row, wherein new pixel values are added to the head and removed from the tail, according to an embodiment of the invention.

Preferably, in the above process, a low-pass filter is applied to the gray level pixels in an image row segment rs of multiple pixels p, in an ROI. The low-pass filtering reduces image noise. Referring to FIG. 4, for example, a moving average type filter is applied, where the values of adjacent pixels p in a row segment rs are added together to produce a (local) average. The number of pixels added together at each step is called the length of the filter. The length of the low-pass filter is equal to the minimum width (Marking_Width_Min) of the marking feature to be located in the image, measured in pixels.

Implementation of Step 105

A differencing operation is then applied to the low-pass filtered pixel values to determine the gradient values (GLV). One pixel is skipped, and a centered-difference is used rather than a forward or backward difference, as the centered difference is more accurate. For example, if the filter length were three pixels, and pixel gray level values for an image pixel sequence of seven pixels p were x1, x2, x3, z1, y1, y2, y3, then the low-pass filtered gradient value at pixel z1 is (y1+y2−x2−x3)/6. The gradient value is normalized by the filter length of three, multiplied by an additional factor of two associated with the centered-difference.

Implementation of Step 106

The average background gradient value for pixels p within the region ROI is estimated. The average background gradient value, used to detect potential marking edges, is used to determine the gradient threshold for the region of interest in the next image frame. The background gradient value in each ROI is calculated as the average of the gradient values that remain after the gradient peaks are disregarded. From the knowledge that each ROI covers only the marking and the immediate local area, wherein a marking is shaped as a single line (an alternate strategy, is used to detect multiple solid lines), then most of the strongest gradient edges found within the ROI are correspond to edges of markings 7L, 7R, and not part of the background.

For each pixel row r of an ROI, therefore, the locations of the two largest non-adjacent gradients (gradient maximums or peaks) and the two smallest non-adjacent gradients (gradient minimums or valleys), are determined, allowing for one of each to belong to a marking and one of each to be noise. The low-pass filtering may results in some "smearing of the pixel intensities and, therefore, a softening of the gradient edges. That is, the low-pass filter may affect the gradients at pixel locations that are within a filter length to the left or right from each gradient maximum or minimum location. As such, starting at each of the maximum and minimum gradient locations, we move across the row to the left and right, disregarding the gradient values until we reach either the length of the low-pass filter, or a zero gradient, whichever comes first. The absolute values of the remaining gradients in each row are summed together and counted to form the background gradient sum and count, for that row. The background gradient sums and counts for all rows in the ROI are summed together to form the background gradient sum and count for the ROI.

Figure 5A:
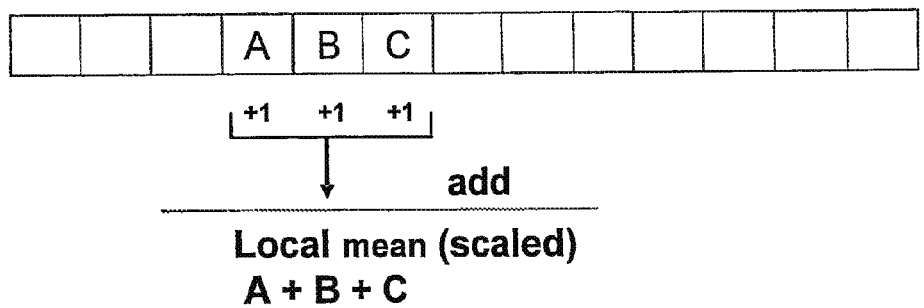
FIG. 5A shows an example calculation of mean absolute deviation (MAD), according to an embodiment of the invention.
Figure 5A:
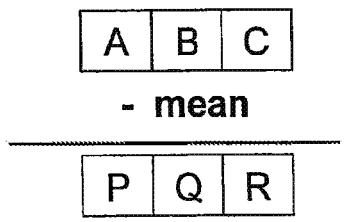
Figure 5A:
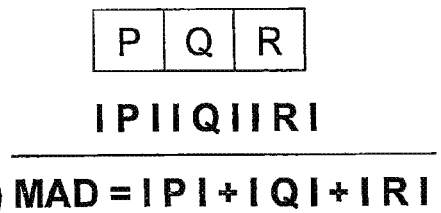
Figure 5A:
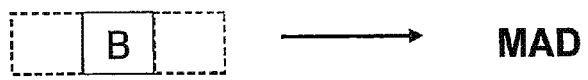

Then the average background gradient value (i.e., gradient threshold) for the ROI is determined as the ratio of the background gradient sum and the is background gradient count. The ratio may be multiplied by a factor, typically approximately 3.0, giving a gradient threshold. This gradient threshold is used to determine which gradient magnitudes are significant in the next frame image (initially, when the detection process begins, a default gradient threshold value may be used for detecting significant gradient values in a first road image). Optionally, the MAD and its gradient can be conveniently calculated during preprocessing, described below in relation to FIG. 5A.

Identifying Lane Marking or Boundary Candidate Points (Steps 107-109)

Implementation of Step 107

Going across each ROI row from left to right, find the locations of each successive gradient peak and valley. A location is determined to be a gradient peak if its gradient is greater than or equal to the gradient threshold, and greater than or equal to the value to its immediate right. A location is determined to be a gradient valley if its gradient is less than or equal to the negative of the gradient threshold, and less than or equal to the value to its immediate right.

In order to enable processing of each current image row as it is received from the camera (i.e., imager), the gradient threshold that was calculated during the previous image frame is applied in the current frame and the gradient threshold that is calculated during the current frame will be applied to the next image frame, and so on. Alternatively, the gradient threshold may be calculated and used within the same image frame. This alternative implementation requires that the pixel values in the entire ROI be available before the marking/boundary detection processing steps and is less computationally efficient.

Implementation of Step 108 and 109

Having identified gradient peaks and valleys in each row of the image, the next action involves pairing left positive gradients (peaks) to right negative gradients (valleys), moving from left to right in each row. It can be determined, via the marking width limits (converted to a number of pixels Marking_Width_Min and Marking_Width_Max), whether a gradient pair (i.e., peak-valley pairs) has the proper spacing d1 between the peak and valley that form the pair. A gradient pair may be from a marking feature (i.e., gradient pair has a width d1 of at least Marking_Width_Min and at most Marking_Width_Max). For the road boundary location, the gradients are not paired, instead they are maintained in separate positive and negative sign groups since a road boundary is a simple edge (i.e. not a pairing of two edges, as in a lane marking).

All the gradient pairs that are strong enough (i.e., greater value than a gradient threshold) and have the proper space between them (i.e., Marking_Width_Min<d1<Marking_Width_Max), are identified in each image row r within the ROI. When there are multiple candidate gradient pairs within a row, a selection procedure is applied to choose the best candidate (the candidate pairs are formed from all the peak-valley pairs). A candidate pair is selected whose width d1 most closely matches a predicted marking width (from a previous frame detection), to be a marking feature 7L or 7R in the ROI (when no marking has been identified in a previous frame, the predicted marking width is a default). When a marking feature 7L or 7R is being tracked from one image frame to the next, the predicted marking width is determined by low-pass filtering the average of the widths of the previously accepted detections in the tracked marking. When multiple candidates match the similar to the past width criterion, that candidate pair is selected whose center position is nearest the predicted marking center position.

The process is repeated across each row within the ROI, identifying at most one candidate gradient pair as a detected marking feature from each row. The location of the inner edge points (pixels) of the identified candidate gradient pairs (i.e., candidate points) are then used in a least-squares or median polynomial fit, to find the best-fitting regression. Along with the location of the inner edge points, we store the gradient magnitudes on the left and right for a detected lane marking feature, and a single gradient value for a boundary. For a lane marking we also store the average brightness between the marking edges. This information can be used later, for example, when the candidate points are assembled into a lane marking or road boundary.

Detecting Lane Marking from Candidate Points by Curve Fitting (Steps 110-115)

Implementation of Steps 110 and 111

The detected candidate points for each row in the ROI are assembled into a lane marking or road boundary by passing a curve fit through them. If the curve (or regression) has a sufficiently small Chi-squared measure (so it fits well), and the current curve has coefficients that match a curve fit from a past image frame, we accept the regression curve as representing the lane marking or road boundary. The curve fitting may need to make multiple passes through subsets of the candidate points if the regression is not accepted.

Implementation of Steps 112 and 113

If the chi-squared measure of a curve is too large (i.e., greater than the chi-squared threshold), or the curve coefficients (slope) do not generally match that of prior image curve fits, then subsets of the candidate points are selected and the curve fit process is performed on the subset candidate points. For lane marking detection, the subsets are formed in two ways. The first is by selecting only those pairs both of whose gradient magnitudes exceed the average of the gradient magnitudes being considered, such that only those pairs with the strongest edges (strong gradient pair candidate points) are used. If this succeeds in providing a curve fit with a small enough chi-squared, then the coefficients of the current curve fit are compared with the coefficients of the recently accepted curve fits.

Implementation of Steps 114 and 115

Should the strong gradient pair points fail the chi-squared threshold and coefficient match tests, then the gradient pairs with the brightest pixels in between are selected for the curve fitting. The brightest pixels are defined as those with average luminance values (gray levels) greater than the average of all the pixel brightness values between all the gradient pairs. Should this succeed (chi-squared now is acceptable), we then compare the coefficients of the current regression (curve fit) with those of recently accepted curve fits. If the coefficient match is acceptable, then the currently selected candidate points represent lane marking features. As such, the curve fit is attempted three times (first based on all the candidate point positions, second based on a subset, being those candidate points with stronger than average gradients, and third based on a subset of those candidate points with a larger than average pixel brightness).

If all three regressions for lane mark detection fail, then a search for road boundary detection is performed. This is because if no lane marking is found in the image, there may still be a simple gradient present that indicates the location of the road boundary. The next stage of processing below for road boundary location, is therefore only executed when no lane marking is found.

Detecting Road Boundary from Candidate Points by Curve Fitting (Steps 116-123)

Implementation of Steps 116 and 117

For road boundary detection, the positive-going and negative-going gradient locations are used separately in a least-mean squares or median polynomial fit. This is because it may reasonably be expected that the road to non-road boundary in a single image frame has the same sign for the gradients over the visible length of a boundary (e.g., a cement to grass boundary will probably be from light to dark in the whole image, possessing negative gradients at the boundary). The first attempt is at fitting a curve with the locations of those gradient values of which there are more present (e.g., if there are mostly negative gradients, then during the to boundary point candidate identification, a curve is fit through the locations of the significant negative gradients). If there is an equal number of gradients present, then the negative-going gradient locations are used first. If either of these curve fits (regressions) has a sufficiently small Chi-squared measure (so it fits the data well), and has coefficients that are similar to recent curve fits, the current curve-fit (regression curve) is accepted as representing the road boundary. The magnitude of the gradients for the road boundary detection must exceed a simple, not adapted to the circumstances, threshold (e.g., 8 gray levels).

Implementation of Step 118

When the chi-squared quality of fit measure for a road boundary detection gradient regression is too large (determined via a threshold e.g., 2.0) or the regression coefficients are not similar to the recent past, then a subset of the gradients is used (as in the lane marking detection process) selecting only those gradients whose magnitude exceeds the mean of the gradient magnitudes being considered. If the curve fit for these subset gradients succeeds in producing an acceptable chi-squared, then the coefficients of the curve fit are then compared with the coefficients of the recently accepted fits for similarity.

Implementation of Steps 119-123

If this current curve fit fails the similar coefficients test, the process proceeds to first trying with all the locations of the gradients of the minority sign, then trying with the stronger than average gradient subset if needed.

First, determine if the complete minority gradient locations line up when fit with a curve (i.e., determine if chi-squared is small enough, and if the slope of this fit matches the recent past). If yes, the locations of the minority gradients correspond to a road boundary.

If chi-squared is too large, or the slope of the fit does not match the recent past, then select a subset of locations of the gradients in the minority, determining if these subset gradients line up when fit with a curve (i.e., determine if chi-squared is small enough, and if the slope of this fit matches the recent past). If yes, the further subset indicates a road boundary. The subset is those gradients from the minority whose magnitude exceeds the average gradient magnitude in the minority.

If even these subset minority gradients do not line up well enough or do not match the past, then proceed to a further analysis using the mean absolute deviations(MAD) measured in the image. This may be undertaken by finding the locations of those MAD gradients whose magnitude exceeds a magnitude threshold. Determine if these locations line up when fit with a curve based on the chi-squared and slope of the fit. If chi-squared is small enough and the slope of the fit matches what was seen in the recent past, the fit is acceptable (indicating a road boundary).

If these locations do not line up well enough, or their slope does not match the recent past slopes, then select the locations of those MAD gradients whose magnitude exceeds the average magnitude of the MAD gradients, and determine if these locations line up by checking chi-squared and the slope of a curve fit to these locations. If yes, then the fit acceptable (these locations represent a road boundary).

Otherwise, the current video frame (image) is 'blind' and no marking or boundary has been found. This causes a distance traveled since the last not-blind frame (the blind stretch) to increase, as well as a blind frame counter to increment. Too long a blind stretch or too many blind frames mean the system has not found a lane marking or boundary for a too long time period and the system proceeds back to its search state, using a maximum width region of interest. Note that the system can be in the search state on one side, while tracking on the other.

MAD Processing

Figure 5B:
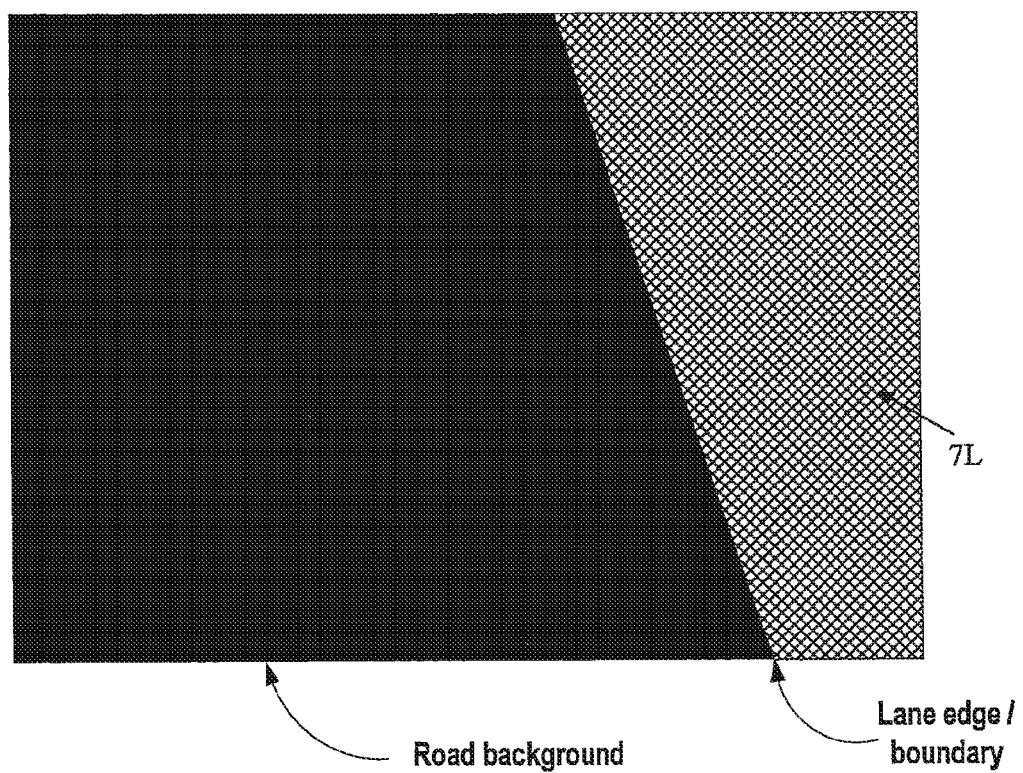
FIG. 5B shows an example road image with lane boundary markings.
Figure 5C:
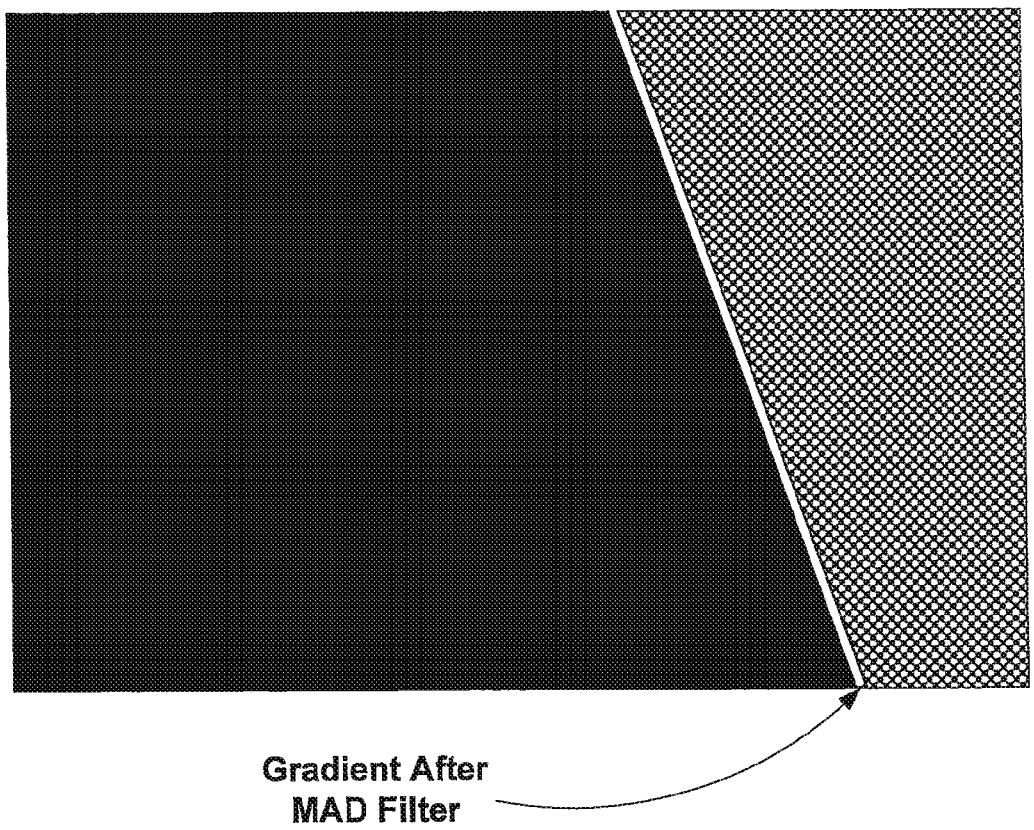
FIG. 5C shows the image in of FIG. 5B after processing through a MAD filter.

It is possible that the road, and what is beyond it, have approximately the same mean gray level or color. This means that the transition between the road, and what is beyond it, will be scarcely visible by comparing the average gray level or color values. This lower visibility then manifests itself as either not enough points being available for the curve fit (polynomial fit), or a poor quality of fit being produced by extra random points, not associated with the boundary. When this is the case, step 104 compares the mean absolute deviation (MAD values) of groups of neighboring pixels, thereby performing a simple texture comparison. As shown by example in FIG. 5A, the computation of the MAD requires subtracting the mean value first (e.g., performed during pre-processing after the moving average low pass filtering), when the local mean is available. The sum |P|+|Q|+|R| is divided by the length of the filter (here this is three) to obtain the MAD. The number of pixels used to compute the MAD is the same as the filter length in each row, so that the low-pass filtering and MAD calculations can easily be combined. Further, in step 105, at each pixel location, a MAD value is generated. The road and non-road areas of the image possibly have different MAD values, as the area beyond the edge of the road probably has a different texture than the road. The MAD values are compared with a numerical derivative, such as the centered difference used for lane marking finding, and the locations where the difference exceeds a threshold, corresponding to an edge between two different textures, are stored. The numerical differentiation can be performed during preprocessing, after the MAD values have been calculated for a row. The same centered difference operation as above can be used on the MAD values as were for the lane marking detection and can be conveniently combined with it. FIG. 5B shows an image of a roadway with lane boundary markings and FIG. 5C shows the gradients in its MAD image after the image in FIG. 5B is passed through a MAD filter, whereby road area and lane marking areas have generally low MAD values (dark colored) and the edges of the lane markings have generally higher MAD values (light colored).

Further, the comparison in step 121 is performed using a simple threshold, so all locations which have an MAD magnitude higher than the threshold, are stored. Such locations correspond to a local change in image texture, such as can be present at the boundary between asphalt and grass, for example. Because the textures must be visible in the image and resolved by the camera, this method generally works best near the camera. Further, in step 122, if a least-squares curve passed through these locations of significantly different MAD provides acceptable results, the coefficients of the current curve are compared with that of a previous image frame. If the reasonableness key factors are not satisfied (measured by Chi-squared and curve fit coefficients), then only those locations which have MAD gradient magnitudes larger than the mean MAD gradient magnitude are used for a second data fitting pass through the candidate points, similar to the three-pass scheme described above. The quality of this fit and its matching the past are tested as before.

This combination of up to nine, multiple passes through the data and using multiple types of data increases the likelihood of finding the road marking or boundaries, making this method better than previous ones.

Moving Average Filter Length

The moving average filter length is determined by the marking base module 43 (FIGS. 2B-D), starting from a minimum feature size. Markings are found by applying a model for them and finding those portions of a road image (within the ROI windows) that match this model. The model exploits the known minimum and maximum sizes of markings, their periodicity (for dashed markings), and their contrast to the background. We assume that the markings are relatively straight, so that a line fit to the candidate marking points (pixels) match the actual marking shape well, but this is not an absolute requirement. The first step is converting the on-the-road dimensions of markings 8L, 8R to their equivalents 7L, 7R in the image plane.

Figure 6A:
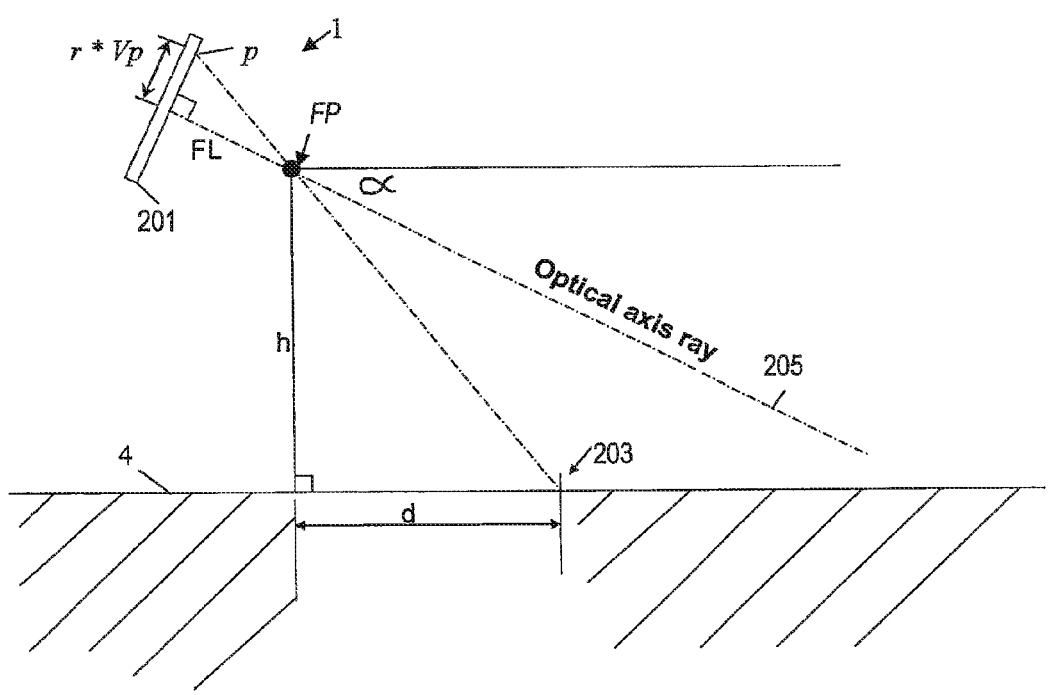
FIG. 6A shows an example side view of camera in relation to the road, illustrating the relationship between the image plane and the distance ahead on the road.

The sizes of real-world marking 8L, 8R and periodicity are converted to their equivalents 7L, 7R in the image plane 201 by knowledge of the camera focal length FL and height h of the camera to the road 4 (FIG. 6A). Specifically, a relation between the camera pitch angle $\alpha$, camera height h, the on-the-ground distance ahead x=d, to a point 203 (P) on the road 4 ahead of the camera 1, the vertical pixel size Vp, the focal length FL, and an image row r (measured relative to the optical axis 205), in the image plane is described as:

$$\tan\left(\alpha - \tan^{-1}\left(\frac{h}{d}\right)\right) * \frac{FL}{Vp} = r. \qquad (1)$$

Figure 6B:
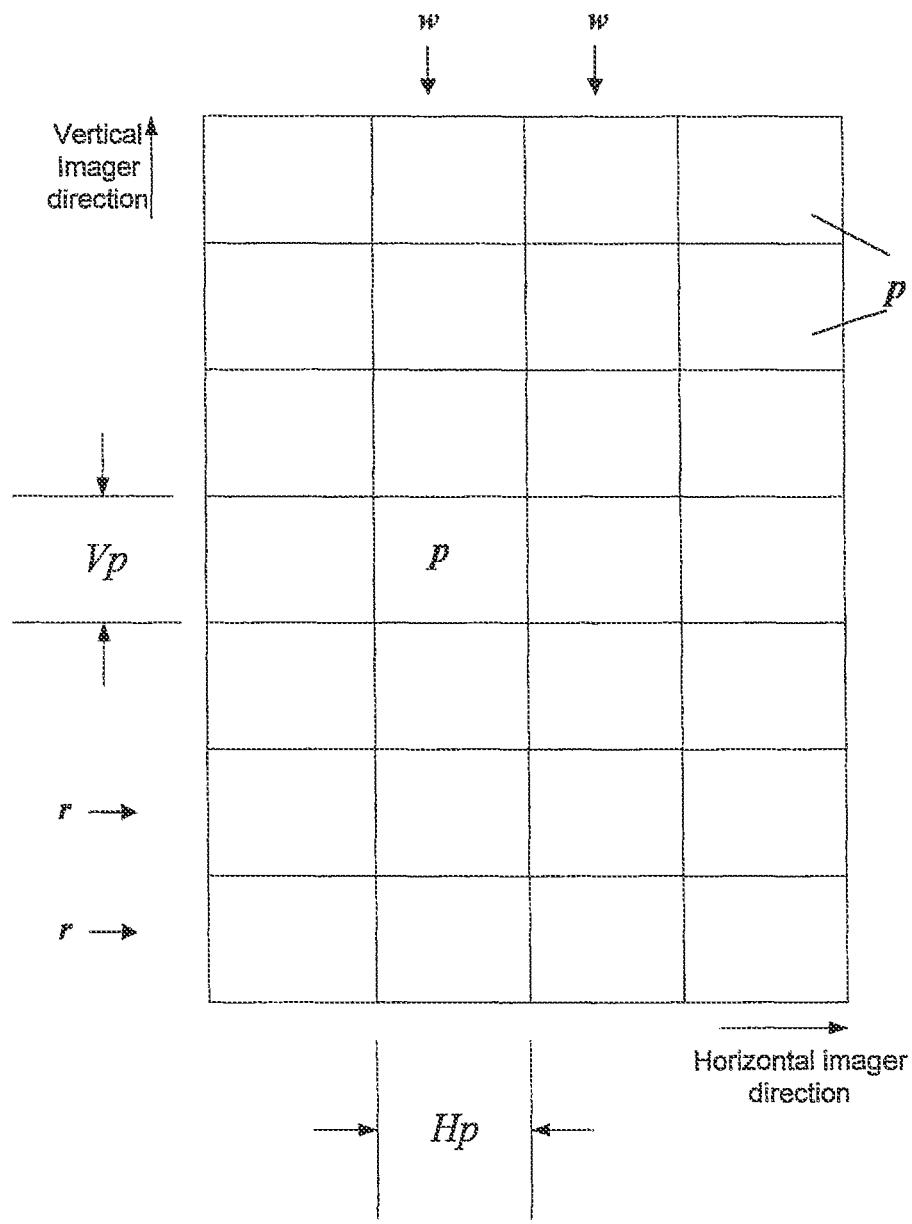
FIG. 6B shows an example of array of image pixels p, arranged in rows r and columns w, illustrating a vertical pixel size Vp and horizontal pixel size Hp, in a road image.

In addition, a pixel p in row r and column w (horizontal pixel size Hp and vertical pixel size Vp, FIG. 6B) projects to a lateral ground distance y (FIG. 3A) on the road ahead as:

$$w=(y*(FL^2 r^2 * Vp^2)^{1/2}/Hp*(h^2+d^2)^{-1/2}), \qquad (2)$$

or $$y=w*Hp*(h^2+d^2)^{1/2}/(FL^2+r^2*Vp^2)^{1/2}. \qquad (3)$$

Column r and the lateral distance y are measured with relation to the optical axis of the camera or its vertical projection onto the road ahead.

Taking y as the minimum marking width, and knowing the distance of this marking, d is determined and then w is determined, which is then the number of pixels a minimum width marking subtends. The number of pixels varies with the distance ahead d, or its image plane equivalent, row r. The vertical and horizontal pixel sizes may be different.

With the size of the minimum width marking determined, expressed in pixels, smaller image features may be removed from consideration by filtering with the appropriate dimension in terms of pixels. Note that the size of a marking, measured in the number of pixels, varies with the distance of that marking from the camera perspective distance (PD), such that as shown by example in FIG. 7, the same size marking 8L or 8R covers fewer pixels in the image the further away it is from the camera, and more pixels the nearer it is. Expressed differently, the minimum marking size uses a shorter filter length for rows near the top of the image than for rows near the bottom of the image, etc. The filter length, computed from the minimum marking width, thus varies with the row location in the image. Higher rows, which are further away, use a smaller filter length than the rows nearby, even for the same width marking.

Coefficient Matching

As discussed, an acceptance (reasonableness) test for a line fit to the candidate points (pixels) fails until the continuity over time of the line slope (similarity of curve coefficients over multiple image frames) is established. This is because a lane marking or road boundary does not suddenly change direction (slope) in the image from frame to frame.

Figure 8:
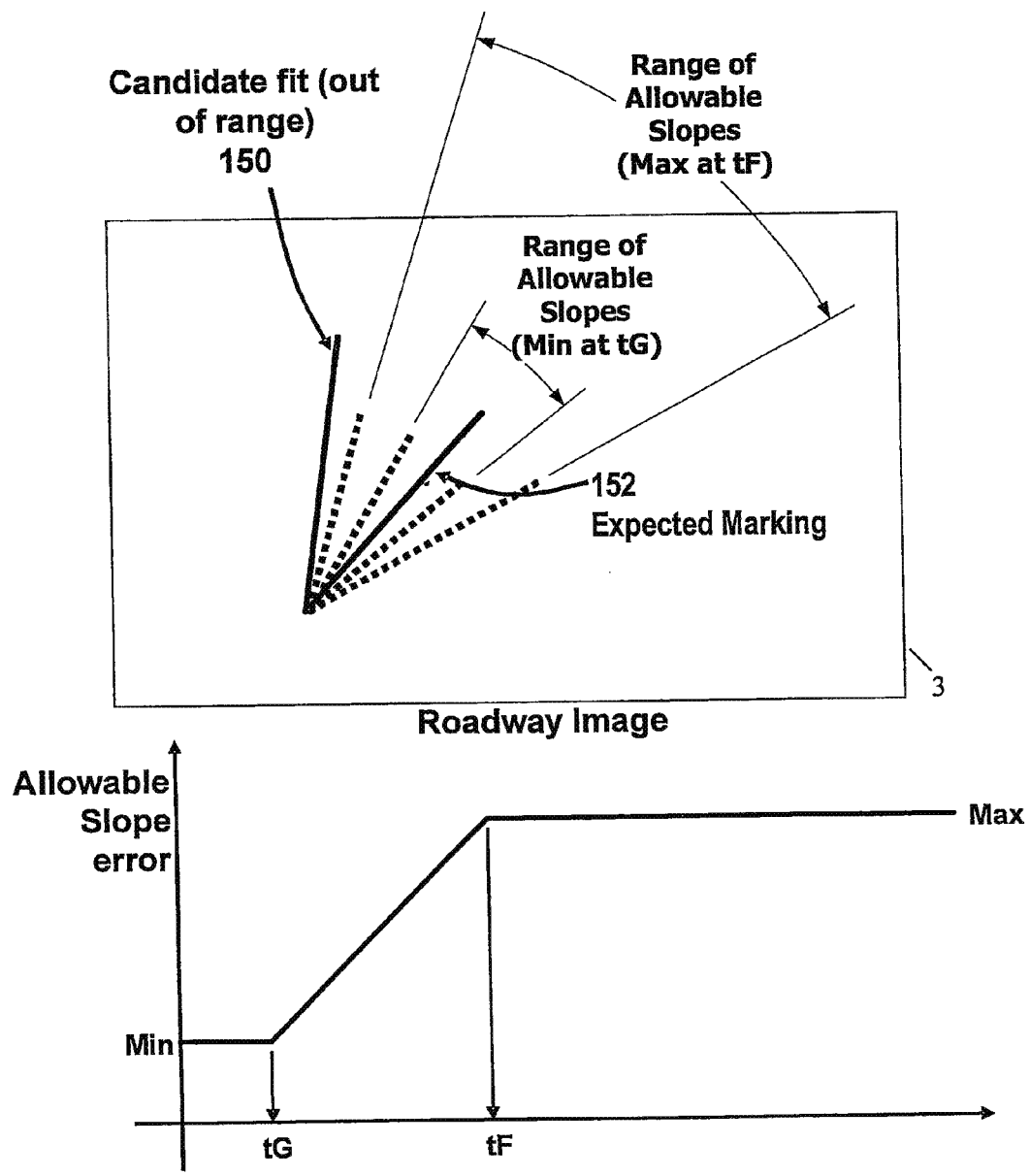
FIG. 8 shows examples of allowable slope change and its change with time, according to the present invention.

The slope of the line fit to the candidate pixels in the current image frame is compared to an expected value based on recent line fit slopes. Denoting the slope from the current frame k by m(k) and the ongoing, accepted line slope by fm(k) a current line fit slope is acceptable if:

$$|(m(k)-fm(k))| < slope\_error, \quad (4)$$

wherein slope_error is selected based on how many frames ago an acceptable line fit slope was detected. The longer ago this was, the more uncertain we are of what the slope should be now and the larger slope_error becomes. FIG. 8 shows an example of the allowable slope errors and their increase with time. Between time tG (up until which time there were acceptable marking fit line slopes (acceptable means similar to values that preceded them), and time tF, the allowable slope error linearly increases from a minimum value Min up to a maximum value Max. FIG. 8 also shows the range of allowable slopes at tG and tF, and a case where slope of a candidate line/curve fit 150 (measured slope) may be out of said range in relation to slope of an expected marking 152. If an acceptable line fit is found whose slope is within the required range, the current filtered slope fm(k) is updated, passing the now accepted measured value through a low-pass filter and combining it with the previous one. This filter is of IIR form, wherein:

$$fm(k) = a*fm(k-1) + (1.0-a)*m(k).$$

It is possible that a line fit with a sufficiently low chi-squared is not found, even with data subsets. It is also possible that a line fit is found, but that this fails the slope error condition (4) test above (do not have a line whose slope closely matches that which is expected). In either case, the process allows for increasing uncertainty about the slope of a marking line fit next time condition (4) is tested. As such slope error is increased as a function of the number of consecutive blind frames:

slope_error=SLOPE_ERROR_FRAME+
SLOPE_ERROR_INTERVAL*number_blind_
frames/max_number_blind_frames.

If a second or higher order line is fit the candidate points found from the gradient evaluation, the above comparison (4) for the in-the-image line slope then includes examining the size of the changes in the second (and possibly higher) order terms. The second order term is related to the curvature of the polynomial fit in the image plane, wherein:

Allowed change in
coefficient=COEFF_ERROR_FRAME+COEFF_
ERROR_INTERVAL* number_blind_frames/
max_number_blind_frames.

The number of blind frames is how long the system has not found an acceptable boundary or marking. Examples of determining and utilizing blind frames and blind stretches are discussed below.

Blind Frame, Blind Stretch Counting

Figure 9:
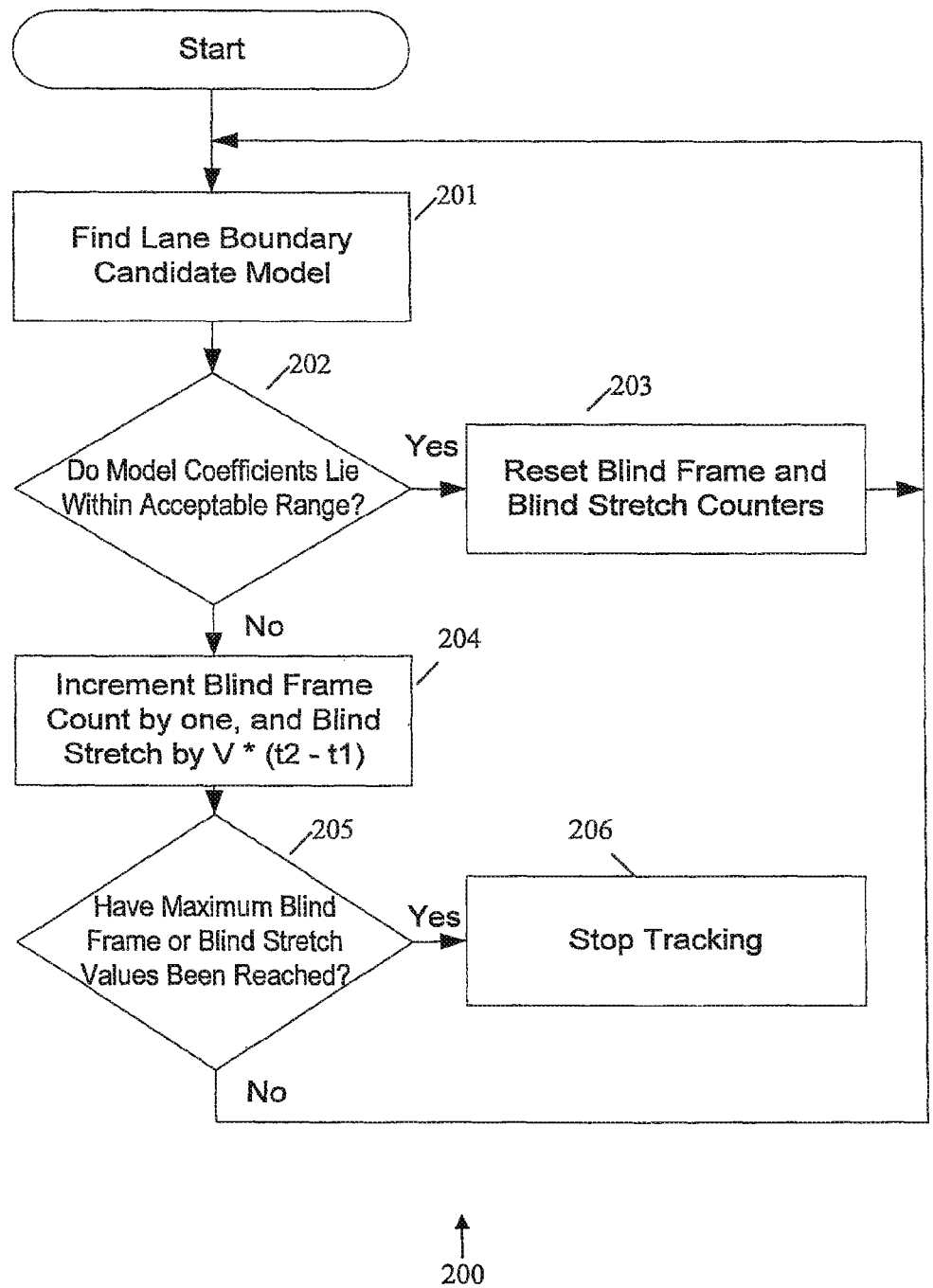
FIG. 9 shows an example of updating blind frame and blind stretch counters and their application to tracking markings, according to the invention.

The measures of blind frames and blind stretch are updated to determine for how long, and how far, an acceptable (reasonable) marking fit has not been detected. Acceptance/reasonableness is determined based on said slope (coefficient) similarity tests, when a line fit to the candidate points is successfully constructed based a chi-squared measure. FIG. 9 shows an example process 200 for using blind frame and blind stretch measures (counters). Specifically, FIG. 9 shows updating blind frame and blind stretch counters and their application to transitioning from tracking markings in consecutive frames based on expected locations of the markings, to searching for markings in a frame if the blind frame and blind stretch counters are beyond acceptable limits. The tracking process 200 includes the following steps:

Step 201: Track marking in the current image frame, by finding a lane marking/boundary candidate model comprising curve fit (or line fit) to candidate points (pixels) in an ROI in the current image, wherein the curve fit has acceptable chi-squared characteristics.

Step 202: Determine if the model slope (measured coefficients) are within an acceptable range of an expected slope from prior images (FIG. 8). If yes, proceed to step 203, otherwise proceed to step 204.

Step 203: Reset the blind frame and blind stretch counters (e.g., to 0); proceed back to step 201 to track marking in the next image frame.

Step 204: Increment blind frame count by one, and blind stretch by the travel distance of the vehicle as V*Δt, wherein V is the current vehicle speed and Δt=(t2−t1) is the frame duration.

Step 205: Determine if the maximum acceptable blind frame or blind stretch values have been reached. If yes, proceed to step 206, otherwise, proceed back to step 201 to track marking in the next image frame.

Step 206: Stop/cease tracking state, and enter marking/boundary search state in the next image frame.

According to process 200, for every image frame not providing an acceptable curve fit, the blind frame counter is incremented by one. When an acceptable fit is found, the blind frame counter is reset to zero. Similarly, for every image frame not providing an acceptable curve fit, the blind stretch is incremented by the distance the vehicle has traveled on the road in the past frame (current vehicle velocity*frame time). When an acceptable fit is found, the blind stretch counter is reset to zero.

The process 200 involves updating the blind frame and blind stretch values, and ceasing tracking if either value becomes too large. When tracking is ceased, the system enters back into search state, and restores the boundary/marking finding window or ROI to its maximum size and default location to search for markings anew without relying on an expected location for the markings based on marking detection in prior images.

In the following, further refinements to detecting lane markings and road boundaries are described. First, the lateral location and width of the boundary detection regions can be refined. Second, the periodicity of dashed lane markings can be taken into consideration to improve the base marking detection discussed above.

Lateral Location and Width of Boundary Detection Regions (ROIs)

This refinement is implemented by the lateral location of regions of interest module 34 (FIG. 2A), and determines horizontal placement, and width of the ROIs, in the image 3 relative to left/right of the image (all in terms of pixels). As described, road boundaries are searched for in two sizes of regions ROI in the road image. These sizes of the ROI are related to whether or not a boundary was previously detected in a frame that meets the blind frame and blind stretch tests above. When an image frame causes the blind frame and blind stretch values to become too large, then the system does not have an expected marking location in the current image ROI to use as a guide for detecting markings in the next image. The ROI size is then selected to be at a maximum, and the ROI are placed symmetrically about the long term averaged horizontal vanishing point VP of the road (FIG. 3B). Preferably, detecting a marking in the maximum ROI is performed approximately centered on the road and somewhat parallel to the markings, a generally reasonable expectation at highway speeds. The distance between the ROIs in the image 3 (FIG. 3B: ROI-L, ROI-R), and size of each, is selected such that the corresponding parallelograms on the road 4 (FIG. 3C: 160-L, 160-R) are at a default lateral lane marking spacing (e.g., about 3.6 meters) and each parallelogram on the road is at a default width (about 2.3 meters). The markings 7L, 7R can be anywhere within the maximized windows ROI, and on one or both sides, and are detected according to process 100 above. FIG. 3C simply shows a few example dimensions.

Then, when a marking feature is detected in the ROI in the current image, the size of the ROI region is evaluated in relation to location of the marking pixels therein. This allows decreasing the size of each ROI and removing noise from consideration, thereby improving the tracking of markings starting from the next frame and onwards. The marking detection region ROI is sized proportionally to the uncertainty in the expected location 152 (FIG. 8) of a marking 7L, 7R in the ROI. The uncertainty in the expected marking location is generated by the Kalman filter through which all measurements pass. The minimum possible width of the ROI is +− two minimum marking widths in pixels, or approximately 30 centimeters total on the road, for a typical minimum marking width of 7.5 centimeters on the road.

Longitudinal Location of Boundary Detection Regions (ROIs)

This refinement is implemented by the longitudinal location of regions of interest module 33 (FIG. 2A). The ROIs (FIG. 3B: ROI-L, ROI-R) are vertically positioned in the image 3 (relative to top/bottom of the image) and their vertical lengths are selected, based longitudinal distance of the corresponding parallelograms (FIG. 3C: 160L, 160R) on the road in terms of near distance and a far distance road positions ahead of the camera 1. For best performance, it is advantageous to have the near edge 162 of each parallelogram on the road 4 as close to the camera 1 as possible, so that there is less obscuration of the camera view, as well as the best resolution, allowing better detection precision. The near edge 162 of each parallelogram is typically located just over the edge of the vehicle hood, if one is present, between approximately 5 and 7 meters away. The near end of the ROI (close to the bottom of the image 3) is determined based on the distance of near edge 162 of the corresponding parallelogram on the road 4.

For the far end of each ROI (close to top of the image 3), there may be a physical limit given by the pixel size of the imager. It is necessary, for distinguishable markings, that these cover at least two pixels in width. For low-pass filtering, a marking in the image is required to be at least two pixels wide, thus reducing the effect of single pixel noise (the smallest average that can be formed finds the mean of just two values). This limits the far edge distance of each ROI from the top of the image 3. Searching for markings at greater road distances may become difficult, given the larger possibility of obscuration and increased uncertainty in exactly where to search in the image, even with smaller pixels. The ROI should therefore be selected to be long enough, however, to bridge the gap between dashed markings and include a useful length of those dashes. The vertical lengths of ROI-L, ROI-R in the image 3 in terms of pixels, are selected based on the desirable longitudinal length of corresponding parallelograms 160L, 160R (e.g., length of parallelogram 162-0, 160-R can be about 15 meters on the road).

Dashed Marking Characterization (Learned Longitudinal Model of Dashed Markings)

This refinement is implemented by the dashed marking characterization module 47 (FIG. 2A). Dashed lane markings impart less certain information than continuous ones, due to the unmarked areas or gaps between them. This reduced certainty leads to the possibility of other marking-like objects confusing the detector, particularly in the gaps between dashes. The characterization module 47 learns the pattern of the dashed markings (e.g., they may be 5 meter long dashes, with 2 meter gaps between them, and that the next dash starts at 1.3 meters away in the next frame), and then eliminates from consideration those marking piece like features in the image that are in the gaps between the dashes. This results in improved tracking of dashes in situations where other marking-like objects may confuse the tracking.

Figure 10:
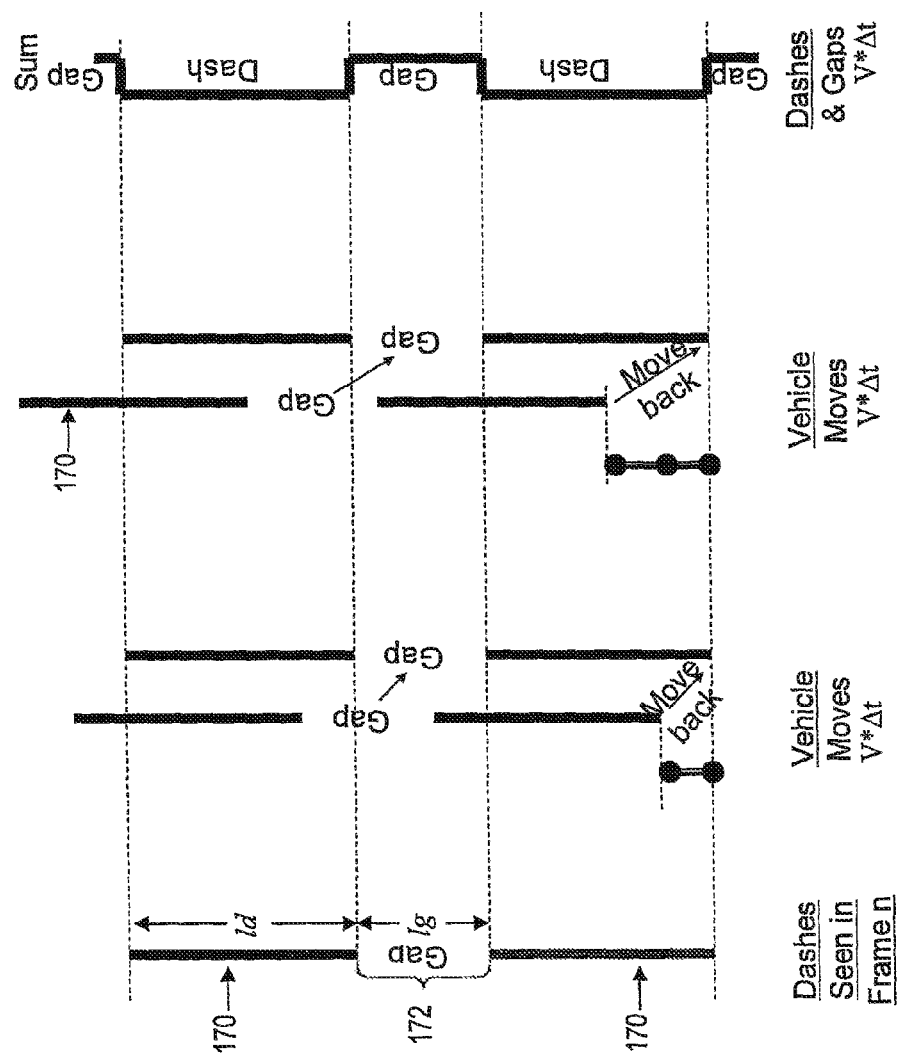
FIG. 10 shows an example of accumulating dashed marking information from road images for detecting markings, according to the invention.

Referring to FIG. 10, in one example a dashed marking is defined as a succession of dashes 170 and gaps 172. The module 47 identifies dashes by voids in the measurement. The marking detection in each image frame constructs a dash pattern for the image. Marking detections in successive image rows are collected together to form a dashed pattern. The row position at the start and end of each dash is converted to the on the road distance from the camera. The dashed marking pattern is described by the distances from the camera to the end points of each detected dash.

As the vehicle travels along the road, an implicit accumulation of overlaid marking patterns is constructed. This overlaying is possible, because it is known how long a distance the vehicle travels between subsequent images, wherein distance traveled=V*Δt (V is vehicle speed and Δt is duration of time between successive frames). By sliding (moving back) the marking patterns seen in previous images toward the vehicle by the distance traveled amount (and the amount accumulates over time), and integrating the marking pattern seen in the current image, a strengthened time history of the detected patterns in the image frames is accumulated, as illustrated in FIG. 10, which shows where the start and end of each dash (and, therefore, the start and end of each gap) occurs along the roadway.

As a particular dash is observed in each subsequent image, the start and end positions of that dash are updated as a function of the previously estimated start and end positions and the current observed positions. The length ld of each dash is determined as dash end to dash start. The length lg of each gap is determined as next dash start to previous dash end. The characterization module 47 uses a dash range defined by a pre-defined minimum and a maximum dash length, and gap range defined by a pre-defined minimum and maximum gap length, in the process of detecting dashed markings. Whenever an interval is observed (either dash or gap) that is outside the prescribed range, the dash marking is considered to have terminated.

When at least three intervals within the prescribed ranges have been observed, either dash-gap-dash or gap-dash-gap, the marking is classified as a dashed marking At this time, the model has learned enough to be applied to predict dash and gap locations in subsequent images frames. The position of the dash-gap pattern in the next frame is predicted by sliding the current pattern toward the vehicle by V*Δt. The distance to the predicted start and end of each dash is converted to the corresponding image row number. A filter is constructed which allows marking detections in image rows that are known to be dash locations and rejects marking detections in those rows that are known to be gap locations.

In addition, the known dash and gap lengths are used to predict dash and gap locations in the image ahead of the observed dash-gap pattern. As there may be some noise in the spacing and length of dashes, a zone of uncertainty at each end of the dashes on the road is allowed, where detections that might belong to a marking are accepted. This zone is e.g. one-half meter long and is applied at both ends of each dash region. Extensive experiments by the inventors with actual roadway data have revealed that marking patterns change frequently as a vehicle moves. For this reason, prediction is limited to one dash-gap interval beyond the most recently observed dash or gap endpoint.

Figure 11:
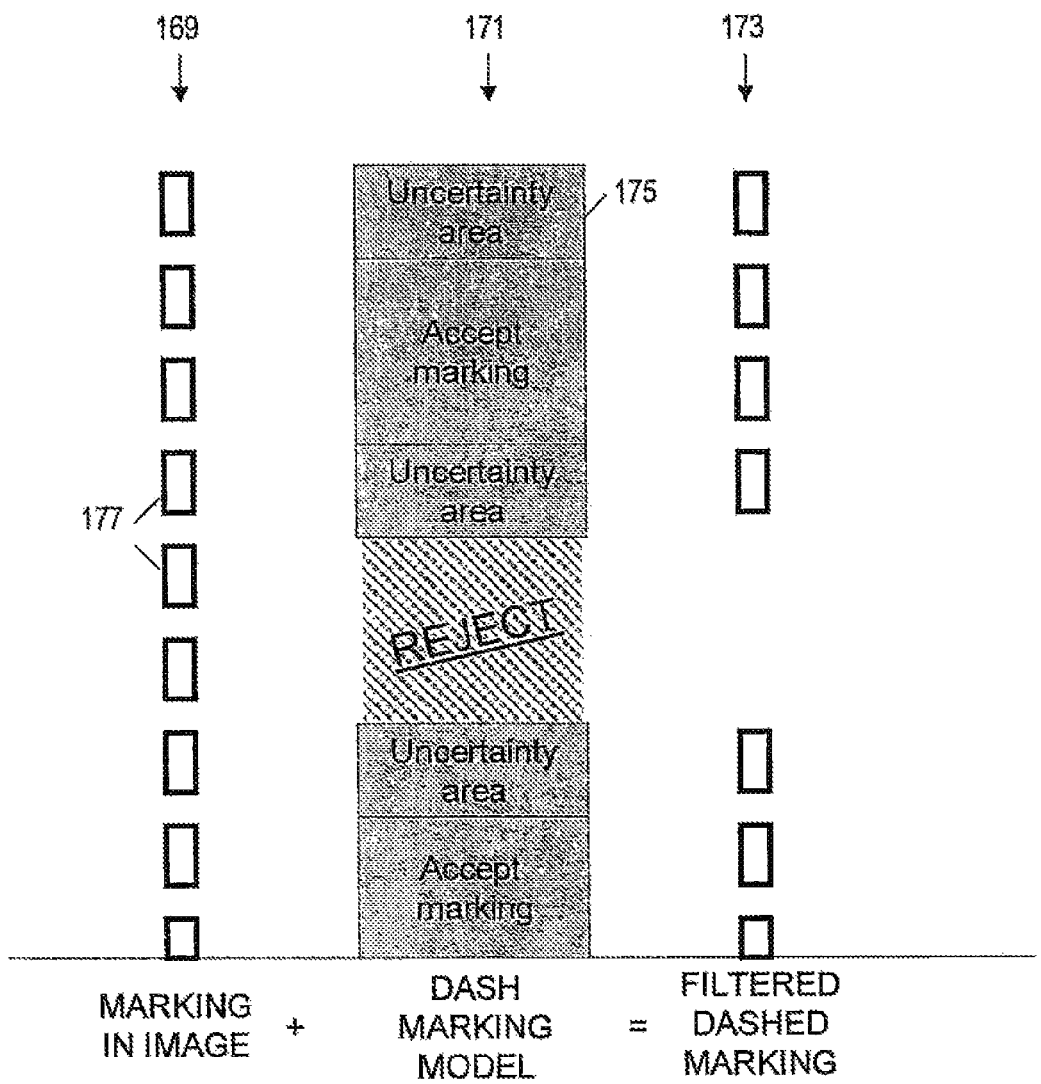
FIG. 11 shows an example application of the learned dashed marking model to detection of markings, according to the invention.

An example application of the dash-gap prediction (model) is shown in FIG. 11, wherein an incoming marking configuration 169 from the image, shown on the left, passes through a filter 171, shown in the center, to generate filtered dashed markings 173, shown on the right. The blocks 177 represent the actual dashed marking pieces found on the road, some of which may be noise. Using the filtering process, marking-like objects in the image that are in the gaps between dashes, and their uncertainty areas 175, are not used to construct road markings (are not used for curve fitting) from the image. Marking candidates located in the gaps between dashes are rejected, allowing for a certain level of uncertainty 175 in accepting road markings (e.g., such uncertainty may be 0.5 meters at the end of each expected dashed marking location, accepting marking pieces found there).

Different Parameters for Day- and Nighttime Operation

The night and day difference module 45b is implemented in this refinement (FIG. 2A). An external sensor determines whether it is day or night, and provides that information to the module 45b. Different physical dimensions/thresholds are used for daytime and nighttime operation. These compensate for the different appearance of what is detected during daytime (e.g., Bott's dots) and nighttime (e.g., reflectors, which have a different size than the Bott's dots, often first become visible at night). There also tends to be much more detail and extraneous objects visible in the daytime than at nighttime. By using dimensions/thresholds tuned differently for daytime and nighttime, the detection system accommodates how the video imager/camera "sees" the road, taking into account, for example, that image blooming may occur at night. Blooming describe a situation wherein the imager (camera) is not able to handle very bright objects at night. Image features due to bright objects leak out, or bloom, into the pixels next to them, changing the appearance of the scene in the image.

Markings appear different during day and night. The difference in appearance arises from the directional illumination used at night (headlights) versus the generally more uniform illumination during the day. Some markings, such as reflectors, are much more visible at night than during the day, due to their directional reflectivity.

Among the dimensions/thresholds that are adjusted between day and night states, are: marking size, number of candidate points required to accept a line fit, marking minimum contrast, etc. All dimensions used in the algorithm are physical, and measured in the road plane.

The marking minimum contrast is adjusted as follows. It is possible that the road is very smooth, and thus it video image has a very low average gradient. The low average gradient may lead to possibly accepting noise as a significant signal in terms of a peak or a valley. As such, a threshold used to find gradient peaks and valleys in the image should have a value of at least some fixed, minimum amount (e.g., from 1 to 255 and preferably between 8 and 20). On noisy roads, with many gradients visible in their images, the background gradient will have a high average value, larger than said minimum, but on very smooth appearing roads, said minimum protects against the incorrect identification of marking pieces with only low gradients.

Additional Refinements

The detection process may be applied to color images. The fundamental measure used here is gray level gradient separation of pixels. Color separation can also be used (e.g., the Euclidean distance between RGB color pixel values) to separate a marking from the background in the image. In addition, the color of those pixels accepted as possibly belonging to a marking may be limited (e.g., markings may not be green). Those pixels accepted as belonging to a marking may be required to have color values sufficiently near to the distance-dependent mean color value of the marking, as dictated by a nearness threshold (e.g., between 1 and 443 for an 8-bit color imager, and may be about 20), and may be filtered over time. The distance dependence arises from the different angle/color of light arriving at different distances.

Further, the physical dimensions used to describe markings on the road also means that their features become smaller in the image as the distance to the markings increases on the road. A small, fixed number of pixels may be used to describe the markings, which does not match the true marking sizes at ranges other than an intermediate one.

Further, a zone priority scheme may be used, when conditions are favorable (e.g., small chi-squared, with many marking gradient pairs found), which allows performing a limited extrapolation of dashed markings forward and backward (e.g., 1.5 meters at either end). This limited extrapolation increases the effective fill factor of sparsely populated markings. A further refining of the data can be performed before the first line fit. The goal is to keep samples that seem to form a coherent line and reject "stray" detections, or those that are not near the seemingly coherent ones.

Figure 12:
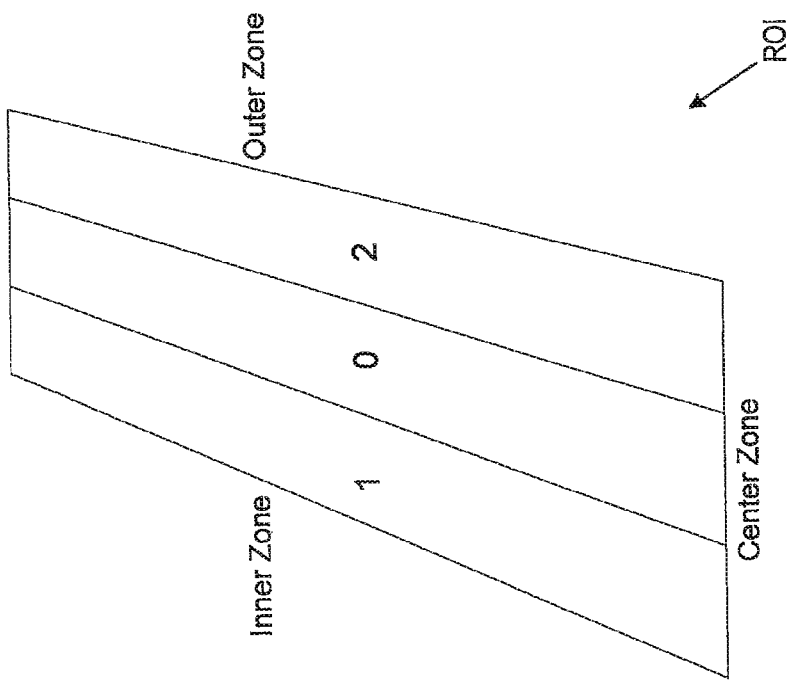
FIG. 12 shows an example priority scheme for improved boundary location/detection, according to the invention.

Since the markings are generally parallel to the longitudinal axis of the ROI, the ROI is divided into several longitudinal zones, for example three, as shown in FIG. 12. The zones are numbered 0 for the center zone, 1 for the inner or nearer to the camera zone, and 2 for the outer or further from the camera zone. Each zone represents an area on the roadway where a marking is expect as the relative position of the vehicle to that marking varies. The predicted marking distance, or center zone, has the highest priority for detecting markings (reflecting that it has the highest probability of containing the marking or boundary). The priority decreases for the zones further away from the center zone. The number of detections in each zone is counted. The single zone or adjacent zone pair with the highest population is determined, using the following rules:

If no detections in the inner zone and no detections in outer zone, then use center zone marking piece detections, Else if the inner zone and center zone both have sufficient marking piece detections, retain these marking piece detections for line-fitting, Else if both the outer zone and center zone have sufficient marking piece detections, retain these marking piece detections for line fitting.

The effect of the rules is to favor the center zone, or a combination of the center zone and the inner or outer zones. The inner zone is checked first, as a marking detected therein will be nearer to the camera and hence more important than a marking detected in the outer zone. Detections that are outside of the center zone or zone pair, are rejected as stray. The net effect is to retain the marking and remove image noise, thereby improving boundary or marking localization.

Figure 13:
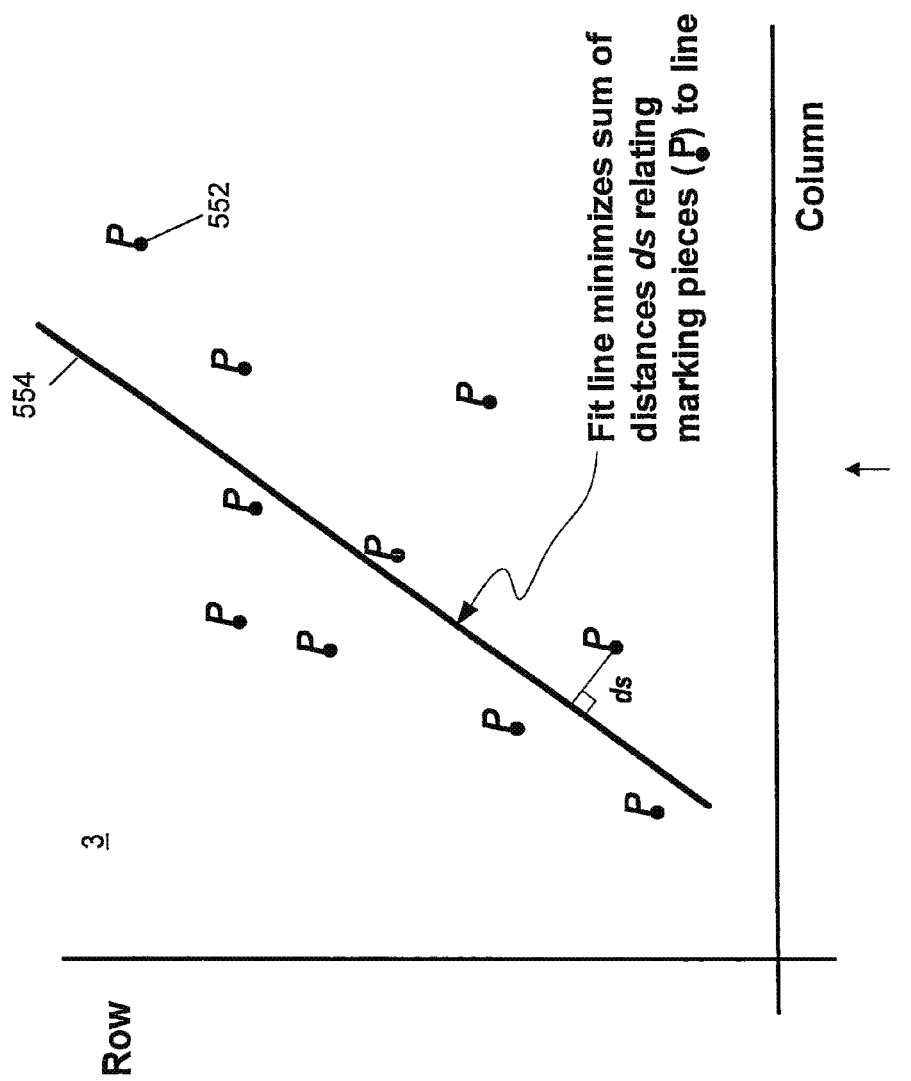
FIG. 13 shows an example of least-squares line/curve fitting.

FIG. 13 shows an example 600 of least-squares line/curve fitting used in step 110 of FIGS. 2B-D, above. Example 600 illustrates line fitting involving a least-squares fit, by minimizing the sum of the distances ds from data points 502 (e.g., pixels or marking features/pieces p) to a fit curve or line 504. Least-squares fitting finds a curve that best fits a set of data points. For example, as shown in FIG. 13, fitting curve or line (as shown here) is adjusted until the sum of the distances ds from each point 502 to the line 504 is minimized. This corresponds to making the average distance from the data to the line fit/curve be a minimum. A least median fit minimizes the median distance from the data to the fitting curve. Other curve/line fitting approaches may also be used, accounting for example, for the larger uncertainty in marking location at greater distances. In application, for each set of points, line fitting involves determining a line fit for all the points between, and including, the nearest and the farthest points with coordinates (x, y) in each of said set of points. The line fit method used is dependent upon the number of points available to fit, as follows. For lines with exactly two points, line fitting implements a simple algebraic line fit. When more than two points are available, a line many not pass through all of the points, though an approximate scheme may fit the points well enough. Therefore, line fitting involves approximate line fitting in a standard least-squares sense or in a least median distance sense. In both cases, the distance ahead x and the lateral distance to the side y, in the plane of the road, are expressed as:

$$y = slope*x + intercept,$$

wherein, slope provides the curvature after division by the average (AV) of the nearest and furthest distances ahead.

In summary, embodiments of the present invention provides processes for detecting lane marking and/or road boundaries from road images, used for assistance in guiding a vehicle down the road. The multiple passes through candidate image pixels for polynomial fits, allows detecting lane markings and road boundaries more often, and more accurately, than otherwise. Further, using mean absolute deviation comparisons allows detecting marking edges in the image when the mean intensities (gray or color level) of the road and surroundings, are similar.

The above processes according to the present invention can be performed in real-time, or on stored imagery. The processes may also be performed on a single CPU, with a pre-processing stage, or in multiple CPUs. Further, as is known to those skilled in the art, the aforementioned processes according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of detecting road or lane identifiers, comprising the steps of:
    receiving an image of a road in front of a vehicle from a video imager;
    determining a region of interest in an identified road in the image using an image processing device; and
    detecting road markings by detecting lane markings in the region of interest, and if lane markings cannot be detected, then detecting road boundaries in the region of interest;
    wherein detecting road markings includes:
        determining luminance gradients in the region of interest; and
        detecting road markings by comparing the luminance gradients to a strength threshold;
    and wherein determining luminance gradients includes determining edge strength in the region of interest to identify potential road marking edges;
    and wherein detecting road markings includes comparing edge strength to said strength threshold by determining peaks and valleys in luminance gradients of image pixels, wherein a gradient peak represents an edge in the image, and a gradient valley represents an edge in the image;
    and wherein detecting road markings further includes for multiple image rows in the region of interest:
        identifying a pair of edges as potential road marking edges by comparing each edge strength to said edge strength threshold;
        determining spacing between the pair of edges; and
        comparing said spacing to spacing minimum and maximum thresholds;
        wherein if the edge pair spacing is between the minimum and maximum thresholds, then the edge pair represents a potential lane marking;
        passing a curve fit through the identified candidate points corresponding to edge pairs in said row representing potential lane markings; and
        selecting all edge pairs that contributed to an acceptable first approximate line fit, as lane marking identifiers.

2. The method of claim 1 further including determining an acceptable first fit line by checking how well the first line fit fits said edge pairs, and similarity of the first line fit slope to that found in previous road images.

3. The method of claim 1 wherein detecting road markings further includes:
    if said edge pair spacing is not between the minimum and maximum thresholds, or an acceptable line fit was not found, then fitting a second line to individual edges in said rows representing potential road boundary identifiers; and
    selecting all edges that contributed to an acceptable second approximate line fit, as road boundary identifiers.

4. The method of claim 3 further including determining an acceptable second fit line by checking how well the second line fit fits said edges, and similarity of the second line fit slope to that found in previous road images.

5. The method of claim 3 wherein if no road boundary identifiers were found, then determining mean absolute deviation (MAD) of gradients in said rows, fitting a third line to locations of MAD gradients whose magnitude exceeds a magnitude threshold individual edges in said rows representing potential road markings, selecting MAD locations that contributed to an acceptable third approximate line fit, as road markings.

6. The method of claim 5 further including determining an acceptable third fit line by checking how well the second line fit fits said MAD gradients, and similarity of the third line fit slope to that found in previous road images.

7. An apparatus for detecting road markings, comprising:
    an image processor configured to receive an image of a road in front of a vehicle from an imager, determine a region of interest in an identified road in the image;
    a road marking detection module configured to detect lane markings in the region of interest, and if lane markings cannot be detected, then detect road boundaries in the region of interest;

wherein the image processor is further configured to determine luminance gradients in the region of interest;

and wherein the road marking detection module is further configured to detect road markings by comparing the luminance gradients to a strength threshold;

and wherein the image processor is further configured to determine luminance gradients by determining edge strength in the region of interest to identify potential road marking edges;

and wherein the road marking detection module is further configured to compare edge strength to said strength threshold by determining peaks and valleys in luminance gradients of image pixels, wherein a gradient peak represents an edge in the image, and a gradient valley represents an edge in the image;

wherein the road marking detection module is further configured such that in multiple image rows in the region of interest, the road marking detection module performs:

identifying a pair of edges as potential road marking edges by comparing each edge strength to said strength threshold;

determining spacing between the pair of edges; and comparing said spacing to spacing minimum and maximum thresholds;

wherein if the edge pair spacing is between the minimum and maximum thresholds, then the edge pair represents potential lane marking;

passing a curve fit through the identified candidate points corresponding to edge pairs in said row representing potential lane markings; and the road marking detection module selects all edge pairs that contributed to an acceptable first approximate line fit, as lane marking identifiers.

8. The apparatus of claim 7 wherein the road marking detection module is further configured to determine an acceptable first fit line by checking how well the first line fit fits said edge pairs, and similarity of the first line fit slope to that found in previous road images.

9. The apparatus of claim 7 wherein the road marking detection module is further configured such that if said edge pair spacing is not between the minimum and maximum thresholds, or an acceptable line fit was not found, then the road marking detection module performs fitting a second line to individual edges in said rows representing potential road boundary identifiers, and selecting all edges that contributed to an acceptable second approximate line fit, as road boundary identifiers.

10. The apparatus of claim 9 further wherein the road marking detection module is further configured to determine an acceptable second fit line by checking how well the second line fit fits said edges, and similarity of the second line fit slope to that in a previous road image.

11. The apparatus of claim 9 wherein the road marking detection module is further configured such that if no road boundary identifiers were found, then the road marking detection module performs: determining gradients of mean absolute deviation (MAD) in said rows, fitting a third line to locations of MAD gradients whose magnitude exceeds a magnitude threshold individual edges in said rows representing potential road markings, selecting MAD locations that contributed to an acceptable third approximate line fit, as road markings.

12. The apparatus of claim 11 wherein the road marking detection module is further configured to determine an acceptable third fit line by checking how well the second line fit fits said MAD gradients, and similarity of the third line fit slope to that found in previous road images.

13. A system for detecting road surface reflections, comprising:

an imager configured to generate an image of a road in front of a vehicle;

an image processor configured to determine a region of interest in an identified road in the image;

a road marking detection module configured to detect lane markings in the region of interest, and if lane markings cannot be detected, then detect road boundaries in the region of interest; and a road departure detection module configured to detect proximity of the vehicle relative to the detected road markings;

wherein the image processor is further configured to determine luminance gradients by determining edge strength in the region of interest to identify potential road marking edges;

wherein the road marking detection module is further configured to compare edge strength to said strength threshold by determining peaks and valleys in luminance gradients of image pixels, wherein a gradient peak represents an edge in the image, and a gradient valley represents an edge in the image;

and wherein the road marking detection module comprises a lane marking detection module configured such that in multiple image rows in the region of interest, the lane marking detection module performs:

identifying a pair of edges as potential road marking edges by comparing each edge strength to said strength threshold;

determining spacing between the pair of edges; and comparing said spacing to spacing minimum and maximum thresholds;

wherein if the edge pair spacing is between the minimum and maximum thresholds, then the edge pair represents potential lane marking;

passing a curve fit through the identified candidate points corresponding to edge pairs in said row representing potential lane markings; and the road marking detection module selects all edge pairs that contributed to an acceptable first approximate line fit, as lane marking identifiers.

14. The system of claim 13, wherein the road marking detection module further comprises a road boundary detection module configured such that if said edge pair spacing is not between the minimum and maximum thresholds, or an acceptable line fit was not found, then the a road boundary detection module performs fitting a second line to individual edges in said rows representing potential road boundary identifiers, and selecting all edges that contributed to an acceptable second approximate line fit, as road boundary identifiers.

15. The system of claim 14 wherein the road marking detection module is further configured such that if no road boundary identifiers were found, then the road marking detection module performs: determining gradients of the mean absolute deviation (MAD) in said rows, fitting a third line to locations of MAD gradients whose magnitude exceeds a magnitude threshold individual edges in said rows representing potential road markings, selecting MAD locations that contributed to an acceptable third approximate line fit, as road markings.

16. The system of claim 15 wherein the road marking detection module is further configured to determine an acceptable line fit line by checking how well the line fit fits said edges, and similarity of the line fit slope to that found in previous road images.

17. The system of claim 16 wherein the image processor is further configured to selectively determine luminance gradients based on an input indicating daytime operation or nighttime operation.

* * * * *